United States Patent
Fujii et al.

(10) Patent No.: US 12,444,994 B2
(45) Date of Patent: *Oct. 14, 2025

(54) ANTENNA DEVICE, FEED SYSTEM, FEED DEVICE, AND FEED METHOD

(71) Applicant: MINEBEA MITSUMI Inc., Nagano (JP)

(72) Inventors: Masaaki Fujii, Nagano (JP); Naoki Tsuji, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 68 days.

This patent is subject to a terminal disclaimer.

(21) Appl. No.: 18/570,371

(22) PCT Filed: Mar. 25, 2022

(86) PCT No.: PCT/JP2022/014516
§ 371 (c)(1),
(2) Date: Dec. 14, 2023

(87) PCT Pub. No.: WO2022/264613
PCT Pub. Date: Dec. 22, 2022

(65) Prior Publication Data
US 2024/0283300 A1    Aug. 22, 2024

(30) Foreign Application Priority Data
Jun. 16, 2021   (JP) ................................. 2021-100369

(51) Int. Cl.
*H02J 50/70*    (2016.01)
*G06T 7/246*    (2017.01)
(Continued)

(52) U.S. Cl.
CPC .............. *H02J 50/70* (2016.02); *G06T 7/246* (2017.01); *G06T 7/50* (2017.01); *G06T 7/73* (2017.01);
(Continued)

(58) Field of Classification Search
CPC .......... H02J 50/70; H02J 50/23; H02J 50/402; H02J 50/80; H02J 50/90; H02J 50/20;
(Continued)

(56) References Cited

U.S. PATENT DOCUMENTS

| | | |
|---|---|---|
| 2014/0253029 A1 | 9/2014 | Uchida et al. |
| 2015/0045091 A1 | 2/2015 | Nakatani |

(Continued)

FOREIGN PATENT DOCUMENTS

| | | |
|---|---|---|
| JP | H01-120906 | 5/1989 |
| JP | H06-085534 | 3/1994 |

(Continued)

OTHER PUBLICATIONS

International Search Report for PCT/JP2022/014516 mailed on May 24, 2022.

(Continued)

*Primary Examiner* — Daniel Cavallari
(74) *Attorney, Agent, or Firm* — IPUSA, PLLC

(57) ABSTRACT

An antenna device includes an array antenna; a phase adjuster; and circuitry configured to acquire, based on a second position, an elevation angle of a projected position that is obtained by projecting a first position of a marker included in an image onto a second plane including a first axis and a third axis, the elevation angle being relative to the third axis of the second plane. The circuitry is configured to control the phase adjuster such that a direction of a beam, emitted by the array antenna based on retrieved phase data, defines the elevation angle for the second plane, the phase (Continued)

data relating to elevation angles that are within a predetermined included angle range.

17 Claims, 12 Drawing Sheets

(51) Int. Cl.
    *G06T 7/50*               (2017.01)
    *G06T 7/73*               (2017.01)
    *H01Q 3/36*              (2006.01)
    *H02J 50/23*             (2016.01)
    *H02J 50/40*             (2016.01)
    *H02J 50/80*             (2016.01)
    *H02J 50/90*             (2016.01)

(52) U.S. Cl.
    CPC ............... *H01Q 3/36* (2013.01); *H02J 50/23* (2016.02); *H02J 50/402* (2020.01); *H02J 50/80* (2016.02); *H02J 50/90* (2016.02); *G06T 2207/30204* (2013.01); *G06T 2207/30244* (2013.01)

(58) Field of Classification Search
    CPC . H02J 50/40; G06T 7/246; G06T 7/50; G06T 7/73; G06T 2207/30204; G06T 2207/30244; H01Q 3/36; H01Q 3/30; H01Q 21/06

See application file for complete search history.

(56) References Cited

U.S. PATENT DOCUMENTS

2018/0226839 A1     8/2018   Higaki et al.
2022/0021112 A1     1/2022   Fujii

FOREIGN PATENT DOCUMENTS

| | | |
|---|---|---|
| JP | 2012-129709 | 7/2012 |
| JP | 2014-120816 | 6/2014 |
| JP | 2014-193056 | 10/2014 |
| JP | 2018-125815 | 8/2018 |
| JP | 2019-135900 | 8/2019 |
| JP | 2020-136918 | 8/2020 |
| KR | 10-2019-0133807 | 12/2019 |
| WO | 2013/080285 | 6/2013 |

OTHER PUBLICATIONS

International Search Report of International Application No. PCT/JP2022/014902 dated May 17, 2022.

FIG.6
(A)
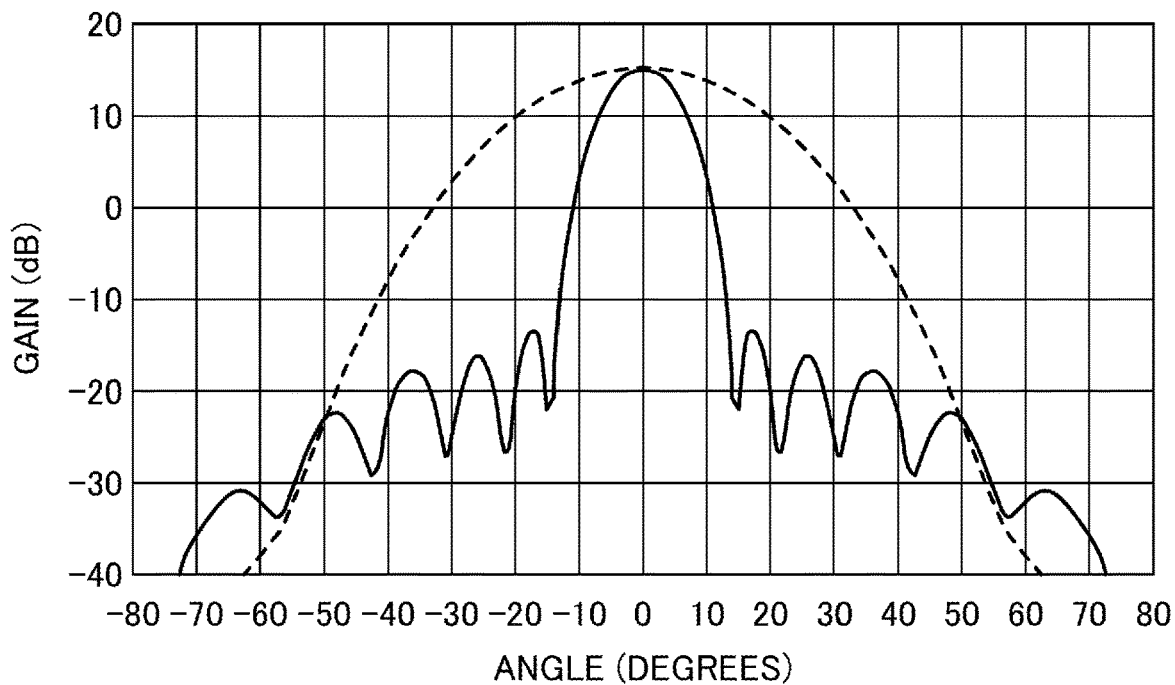
(B)
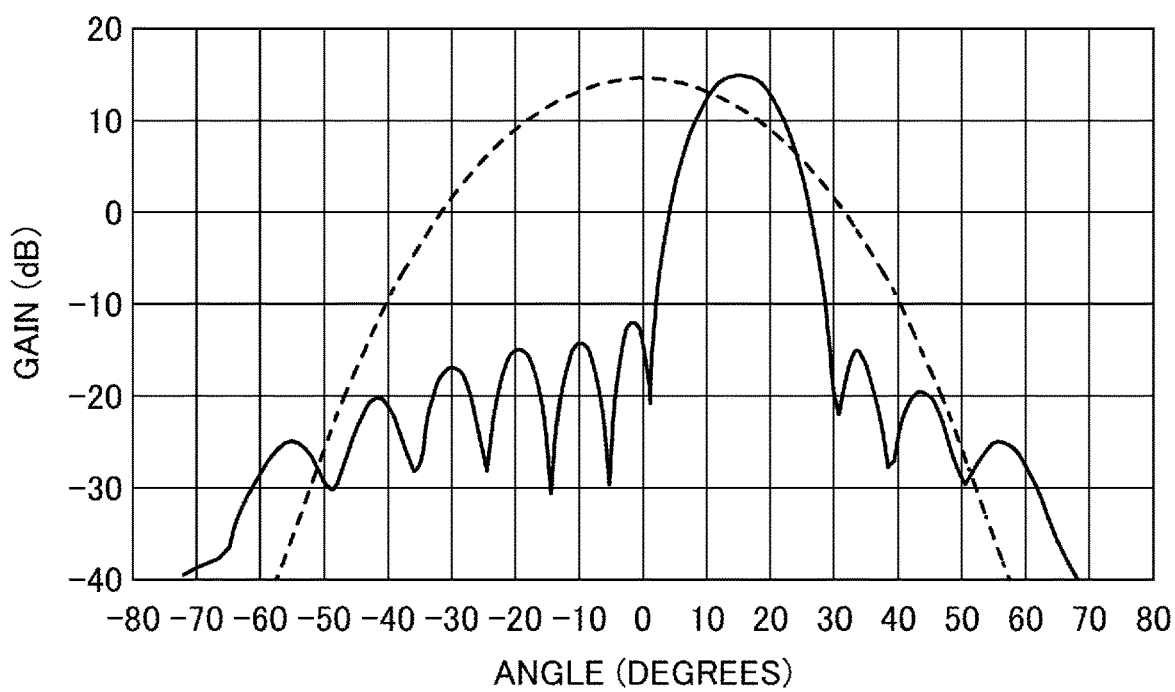

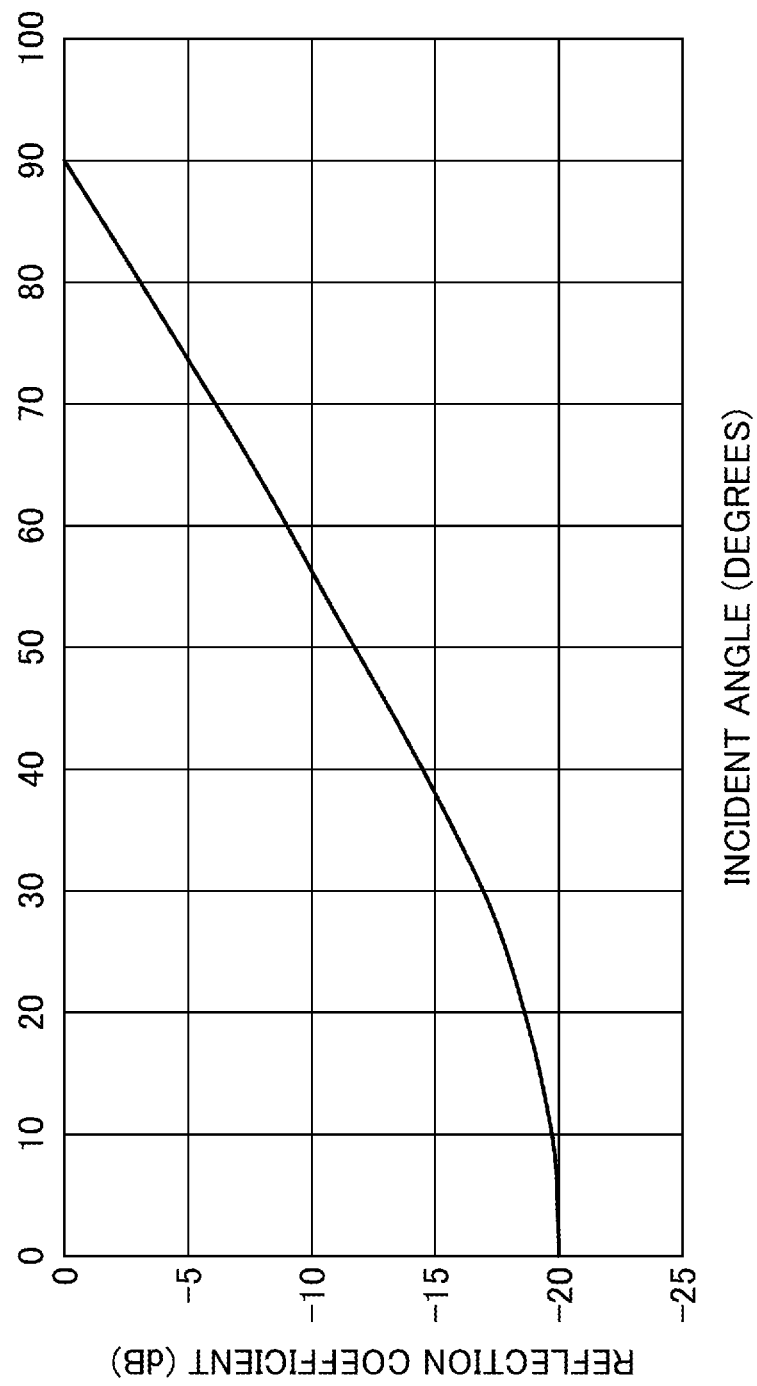

ANTENNA DEVICE, FEED SYSTEM, FEED DEVICE, AND FEED METHOD

TECHNICAL FIELD

The present invention relates to an antenna device, a feed system, a feed device, and a feed method.

BACKGROUND

There has been a wireless power transmitter, and the wireless power transmitter includes a beam transmitter that transmits a feed energy beam to a wireless power receiver that is mounted on an airplane, an information acquiring unit that acquires control information for increasing power reception efficiency of the wireless power receiver, and a controller that controls the energy beam based on the control information so as to increase the power reception efficiency of the wireless power receiver. As a power transmitting antenna, the use of an array antenna is described (see Patent Document 1, for example).

CITATION LIST

Patent Document

Patent Document 1: Japanese Unexamined Patent Application Publication No. 2019-135900

SUMMARY

Problem to be Solved by the Invention

When power is transmitted by the multiple antennas in the array antenna, and then the wireless power receiver receives the power that is transmitted from multiple antenna elements of the array antenna, in a case where the wireless power receiver is mounted on an airplane as in the conventional wireless power transmitter, there is a sufficient distance between the wireless power transmitter (feed device) and the wireless power receiver (power receiver). With this arrangement, a distance difference between the multiple antenna elements and the power receiver is provided to the extent to which the distance difference is negligible. In this case, even when the power is transmitted by the multiple antenna elements to the same target, a smaller phase shift occurs when the power receiver receives the power, and thus a problem is unlikely to occur.

However, when the distance between the power receiver and the feed device is a short distance of about several meters, in a case where the power is transmitted from the multiple antenna elements to the same target, a difference between power transmission distances that are obtained in a case where the power receiver receives the power is large, and thus an increased phase shift occurring when the power receiver receives the power is increased. Therefore, there may be a problem in that a combination of received power is reduced.

Therefore, an object is to provide an antenna device, a feed system, a feed device, and a feed method that suppress the spread of a reflected portion of a transmitted power signal to allow for reductions in an effect of interference on any other device that may exist around a given position.

Means to Solve the Problem

An antenna device according to the present invention includes an array antenna including multiple antenna elements that are bidimensionally arranged along a first axis and a second axis; a phase adjuster configured to adjust phases of transmission power signals that are respectively supplied by the multiple antenna elements, with respect to a first axis direction; an image acquiring unit configured to acquire an image through a fisheye lens; a position deriving unit configured to convert a first position of a marker that is included in the image acquired by the image acquiring unit, into a second position of polar coordinates on a first plane that includes the first axis and the second axis, the first position being used in the image acquiring unit; an elevation-angle acquiring unit configured to acquire, based on the second position, an elevation angle of a projected position that is obtained by projecting the first position onto a second plane including the first axis and a third axis, the elevation angle being relative to the third axis of the second plane; a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched; and a controller configured to retrieve, from the storage, the phase data in association with the elevation angle acquired by the elevation-angle acquiring unit, and control the phase adjuster such that a direction of a beam, emitted by the array antenna based on the retrieved phase data, defines the elevation angle for the second plane. The phase data is phase data relating to the elevation angles that are within a predetermined included angle range.

Effects of the Invention

An antenna device, a feed system, a feed device, and a feed method that suppress the spread of a reflected portion of a transmitted power signal to allow for reductions in the effect of interference on any other device that may exist around a given device can be provided.

BRIEF DESCRIPTION OF DRAWINGS

FIG. 6 is a diagram for describing low sidelobes of a beam that is emitted by the array antenna 110.

FIG. 12 is a diagram illustrating a characteristic example of a reflection coefficient with respect to an incident angle of the beam to a radio wave absorber 52.

DESCRIPTION OF EMBODIMENTS

Embodiments to which an antenna device, a feed system, a feed device, and a feed method of the present invention are applied are described below.

EMBODIMENTS

Figure 1:
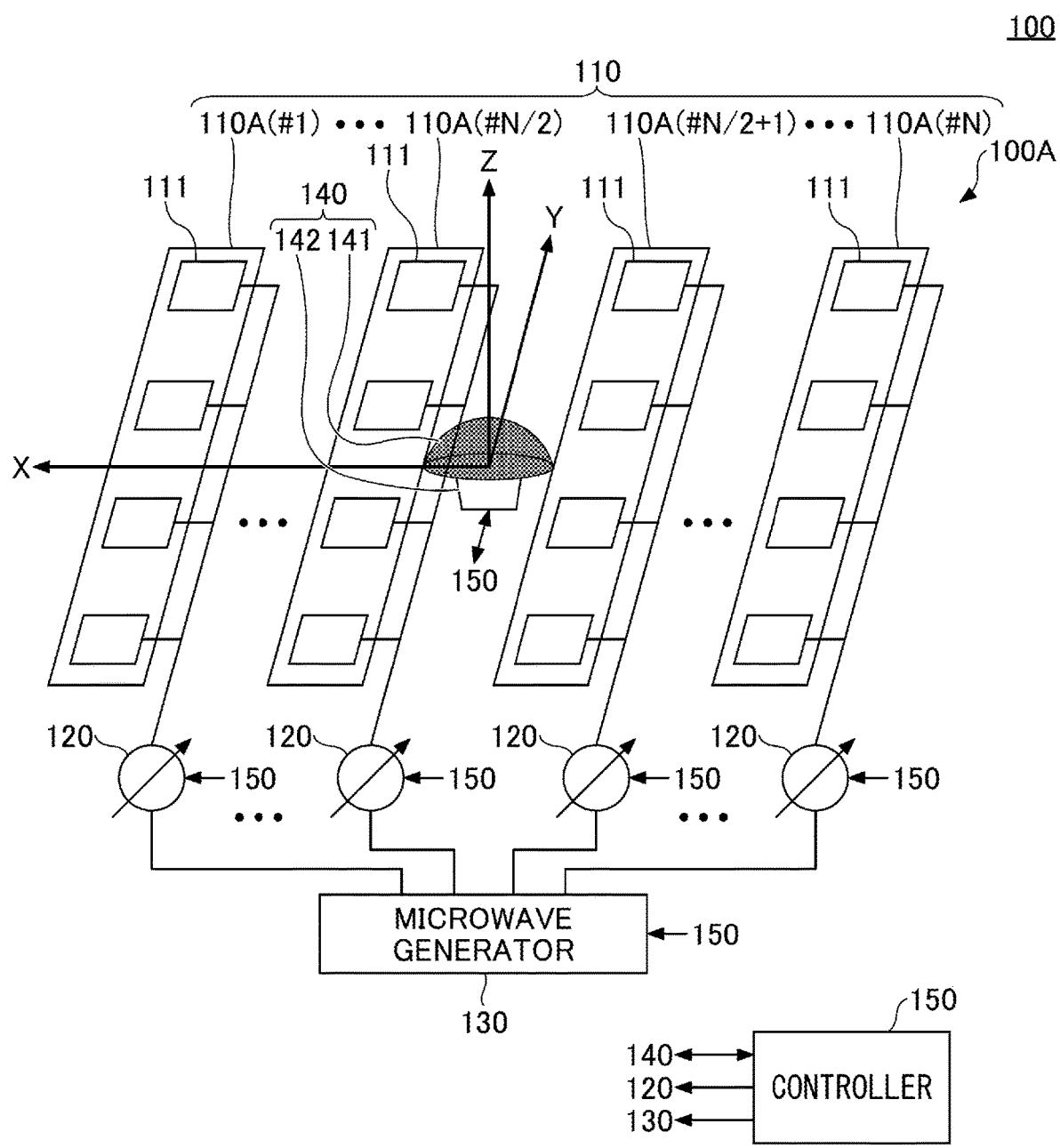
FIG. 1 is a diagram illustrating a feed device 100 according to an embodiment.

FIG. 1 is a diagram illustrating a feed device 100 according to the embodiment. The feed device 100 includes an array antenna 110, phase shifters 120, a microwave generator 130, a camera 140, and a controller 150. An antenna device 100A according to the embodiment is obtained by removing the microwave generator 130 from the feed device 100.

In the following description, an XYZ coordinate system is used. A plan view refers to an XY plan view. An X-axis is an example of a first axis, a Y-axis is an example of a second axis, and a Z-axis is an example of a third axis. The XY plane is an example of a first plane, and an XZ plane is an example of a second plane.

For example, the array antenna 110 is divided into N subarrays 110A. The first (#1) to the N-th (#N) subarrays 110A in the N subarrays are illustrated. Here, N is an integer greater than or equal to 2, and in FIG. 1, a manner in which N is an even number greater than or equal to 4 is illustrated. The N subarrays 110A are arranged in an X-axis direction (first axis direction), and each subarray 110A includes four antenna elements 111, for example. In this arrangement, the array antenna 110 includes 4N antenna elements 111, for example. Each array antenna 110 extends in a Y-axis direction (second axis direction). The antenna elements 111 are patch antennas each of which has a rectangular shape in a plan view. The array antenna 110 may include a ground plate that is held at a ground potential and is on a negative Z-axis side of the antenna elements 111. In an example, a center of a position of the 4N antenna elements III coincides with the origin of the XYZ coordinate system. In addition, it is sufficient when the number of antenna elements 111 included in each subarray 110A is two or more, and it is sufficient when these antenna elements are bidimensionally arranged.

Figure 2:
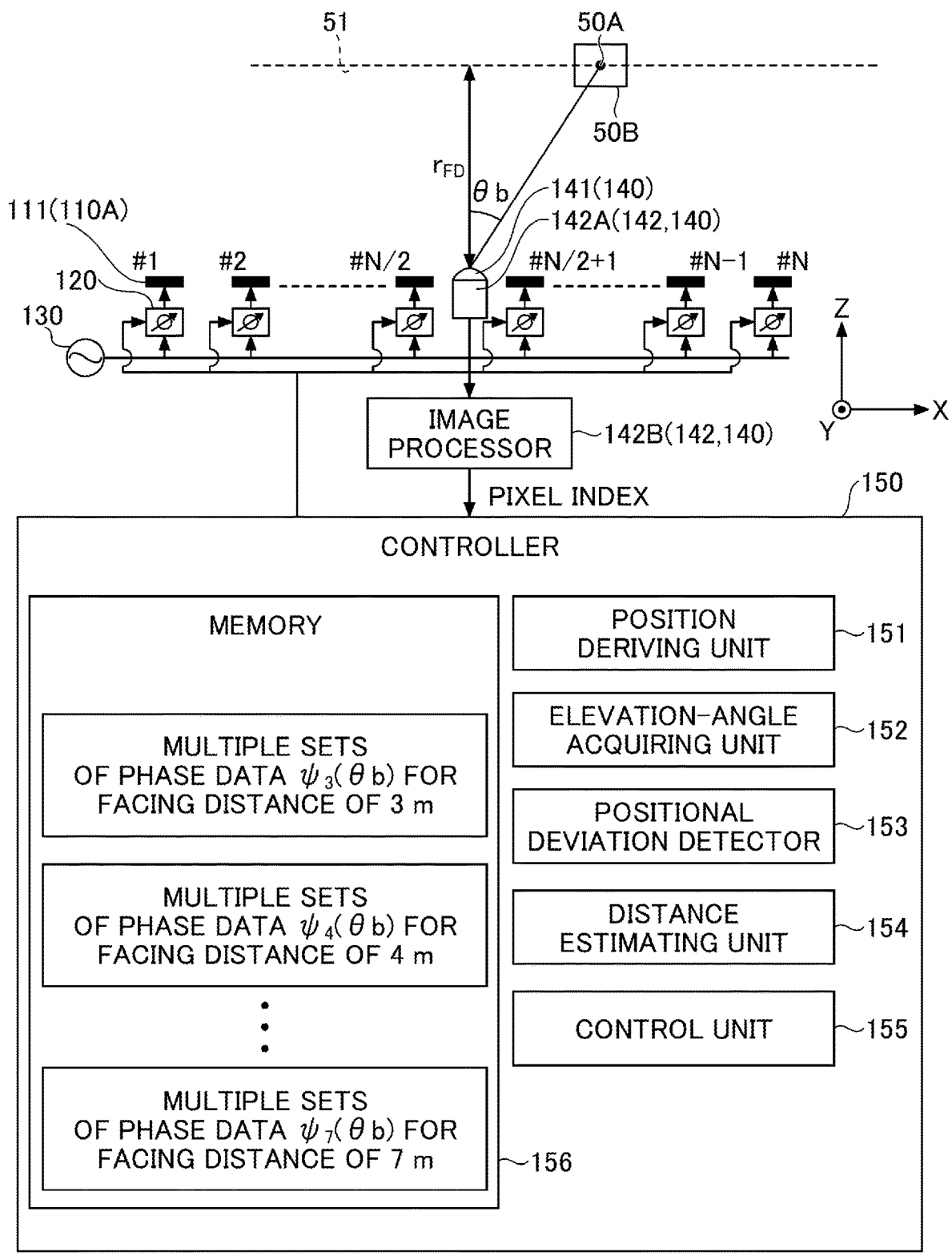
FIG. 2 is a diagram illustrating the feed device 100 according to the embodiment.

The description will be provided below with reference to FIG. 2 in addition to FIG. 1. FIG. 2 is a diagram illustrating the feed device 100 according to the embodiment. Although the origin of the XYZ coordinate system is shifted in FIG. 2 for purposes of facilitating the visualization of the figure, the description will be provided below on the assumption that the origin of the XYZ coordinate system coincides with the center of the position of the 4N antenna elements 111 as illustrated in FIG. 1. FIG. 2 illustrates antenna elements 111 in the respective subarrays 110A that are disposed in a negative Y-axis direction with respect to the X-axis. FIG. 2 also illustrates components included in the controller 150, a marker 50A, and a power receiver 50B. The marker 50A and the power receiver 50B are fixed to an inner wall 51 of a tunnel, for example. The inner wall 51 of the tunnel is an example of a wall, and an interior of the tunnel is an example of a space at which the marker 50A disposed along the inner wall 51 exists. In an example, the antenna device 100A and the feed device 100, which are mounted on a working vehicle, travel in the tunnel, while detecting the marker 50A that is attached to the inner wall 51 of the tunnel, and then the antenna device 100A and the feed device 100 transmit power to the power receiver 50B.

In FIG. 2, the marker 50A is present toward a direction that is defined using an angle θb relative to the Z-axis in a XZ plan view. In FIG. 2, the XYZ coordinate system is shifted for convenience of description. However, the origin of the XYZ coordinate system coincides with the center of the position of the 4N antenna elements 111, and thus the angle θb is an angle between a straight line that connects the origin of the XYZ coordinate system and the marker 50A on the XZ plane, and the Z-axis. When the XZ plane is viewed from the positive Y-axis direction, the angle θb indicates a positive value in a case where the angle θb points toward a positive X-axis direction. In contrast, the angle θb indicates a negative value in a case where the angle θb points toward a negative X-axis direction.

N phase shifters 120 are respectively provided to correspond to the N subarrays 110A, and the N phase shifters 120 are coupled to antenna elements 111 of the N subarrays 110A. The phase shifter 120 is an example of a phase adjustor that adjusts a phase, and is an example of the phase shifter. In each subarray 110A, four antenna elements 111 are coupled in parallel to one phase shifter 120. The phase shifter 120 is an example of a phase adjuster.

In each subarray 110A, transmission power signals in the same phase are respectively supplied to the four antenna elements 111. Phases of the transmission power signals that the N phase shifters 120 output to the N subarrays 110A, respectively, are different from one another. In this arrangement, an angle (elevation angle) of a beam that is formed by radio waves emitted by the 4N antenna elements 111 can be controlled in the XZ plane.

The beam formed by the radio waves emitted by the 4N antenna elements 111 is synonymous with the beam output from the array antenna 110. The beam output from the array antenna 110 is synonymous with the beam output from each of the antenna device 100A and the feed device 100.

The microwave generator 130 is coupled to the N phase shifters 120, and supplies a microwave of predetermined power. The microwave generator 130 is an example of a radio wave generator. A frequency of the microwave is, for example, a frequency in a 920 MHz band. A manner in which the feed device 100 includes the microwave generator 130 is described in this description, but the microwave is not limiting. It is sufficient when a radio wave at a predetermined frequency is used.

The camera 140 is arranged between an (N/2)-th subarray 110A and an (N/2+1)-th subarray 110A in the X-axis direction. The camera 140 is arranged between a second antenna element 111 and a third antenna element 111 in the positive Y-axis direction, among the four antenna elements 111 that are included for each subarray in the Y-axis direction. The camera 140 includes a fisheye lens 141 and a camera body 142. The camera 140 is an example of an image acquiring unit. In FIG. 2, the camera body 142 is illustrated for a capturing unit 142A and an image processor 142B separately.

The fisheye lens 141 is a lens that employs equidistant projection. In an example, a central position of the fisheye lens 141 coincides with each of a center of the 4N antenna elements 111 and the origin of the XYZ coordinate system. The camera body 142 is a portion of the camera 140 other than the fisheye lens 141. The camera body 142 may include a camera with a complementary metal oxide semiconductor (CMOS) image sensor, or may include an infrared camera.

The camera 140 acquires an image including the marker 50A through the fisheye lens 141, and outputs image data to the controller 150. The marker 50A is attached to the power receiver 50B with a power receiving antenna that is a target to be irradiated with the beam output from the antenna device 100A and the feed device 100. The antenna device 100A and the feed device 100 determine a position of the marker 50A included in the image that is acquired by the camera 140, and emits the beam toward the power receiver 50B.

The camera body 142 includes the capturing unit 142A and the image processor 142B. The capturing unit 142A includes an imaging element, and is a portion that acquires the image data by capturing the image through the fisheye lens 141. The image processor 142B performs image processing, such as binarization, on the image acquired by the capturing unit 142A, and outputs a pixel index to the controller 150. The pixel index is an XY-coordinate value (address) indicating the position of the marker 50A on an imaging screen.

In addition, while the working vehicle on which the antenna device 100A is mounted is moving, the image processor 142B sets a region as a target to be detected with respect to the image acquired by the capturing unit 142A, under ROI (region on interest) control. The image processor 142B waits for the marker 50A to enter the region. When the marker 50A enters the region, the image processor 142B tracks the marker 50A over a predetermined included angle range, under the ROI control. When terminating the tracking over the predetermined included angle range, the image processor 142B waits again. The predetermined included angle range is, for example, a range of angles θb of ±15 degrees relative to a frontal direction of the fisheye lens 141. The frontal direction of the fisheye lens 141 is the positive Z-axis direction in which the center of the fisheye lens 141 (the origin of the XYZ coordinate system) passes, and is the frontal direction of the antenna device 100A.

The controller 150 includes a position deriving unit 151, an elevation-angle acquiring unit 152, a positional deviation detector 153, a distance estimating unit 154, a control unit 155, and a memory 156. The controller 150 is implemented by a computer that includes a CPU (central processing unit) and a memory. Functions of the position deriving unit 151, the elevation-angle acquiring unit 152, the positional deviation detector 153, the distance estimating unit 154, and the control unit 155, implemented by a program that the controller 150 executes, are expressed by respective functional blocks. The memory 156 functionally expresses a memory in the controller 150.

Figure 3:
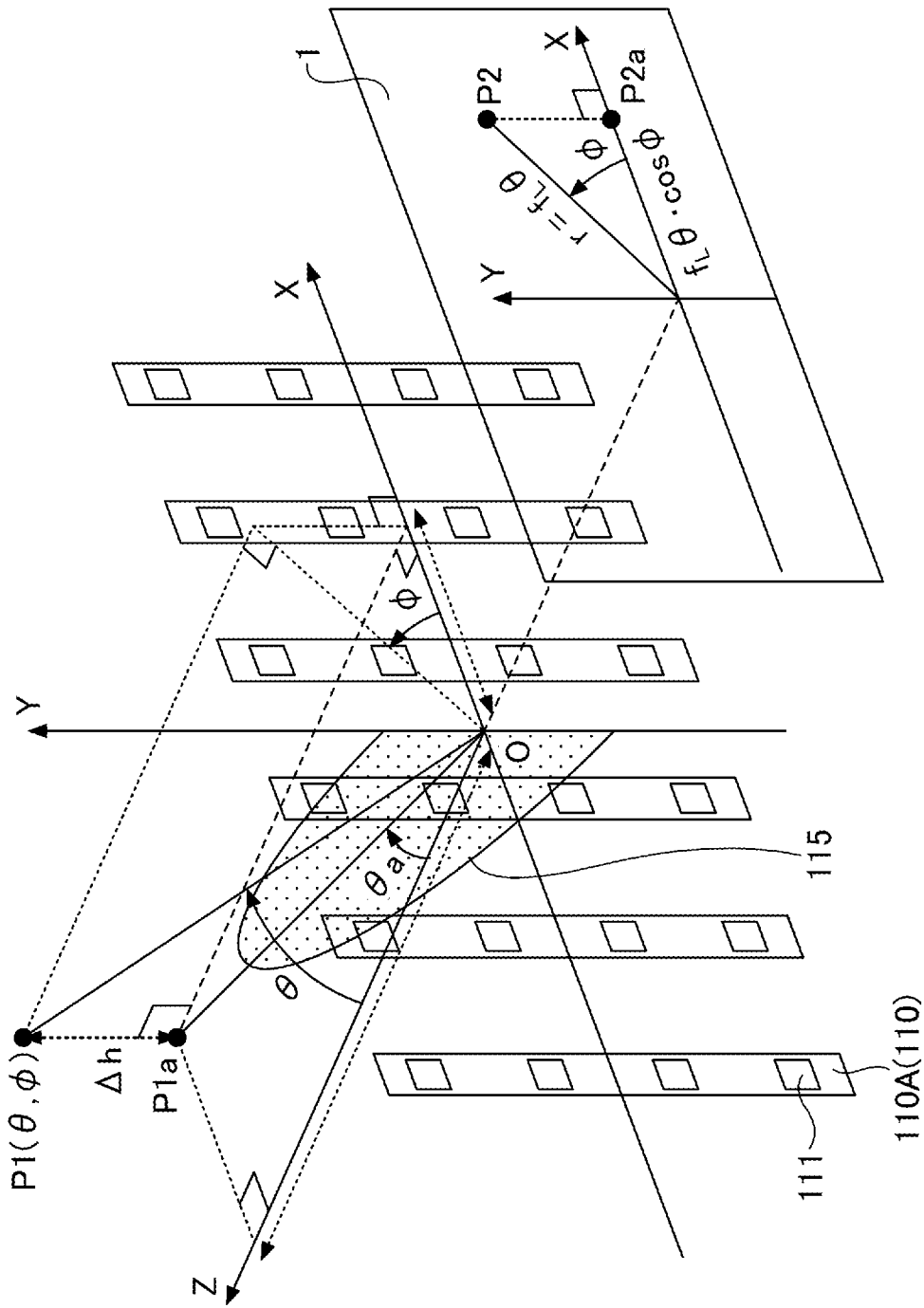
FIG. 3 is a diagram illustrating a polar coordinate system of an array antenna 110.

The position deriving unit 151, the elevation-angle acquiring unit 152, the positional deviation detector 153, the distance estimating unit 154, the control unit 155, and the memory 156 are described below with reference to FIG. 3 in addition to FIGS. 1 and 2. FIG. 3 is a diagram illustrating a polar coordinate system of the array antenna 110. In FIG. 3, the subarrays 110A of the array antenna 110 in the feed device 100, the antenna elements 111 included in the subarrays 110A, and a beam 115 that is output from the array antenna 110 are illustrated, and components other than the above components are omitted. In FIG. 3, the polar coordinate system on a plane 1 that is parallel to the XY plane is illustrated.

The position of the marker 50A in the XYZ coordinate system is expressed as P1. An elevation angle and an azimuth angle that are derived from a line segment that connects the origin O and the position P1 are expressed as θ and φ, respectively. The elevation angle is an angle relative to the positive Z-axis direction, and the azimuth angle is an angle relative to the positive X-axis direction. A clockwise direction that is obtained in a plan view viewed from the positive Z-axis direction is expressed using a positive value. The elevation angle derived from a line segment connecting a position P1a, obtained by projecting the position P1 onto the XZ plane, and the origin O is expressed as θa. The elevation angle θa is an angle that is approximately obtained by projecting the elevation angle θ onto the XZ plane, when the position of the marker 50A is close to the XZ plane. As in an angle θb, when the XZ plane is viewed from the positive Y-axis direction, the elevation angle θa indicates a positive value in a case where the elevation angle θa points toward the positive X-axis direction. Also, the elevation angle θa indicates a negative value in a case where the elevation angle θa points toward the negative X-axis direction.

The position P1 is an example of a first position, and the position P1a is an example of a projected position. The origin O is an example of a reference point of the XYZ coordinate system.

The antenna device 100A and the feed device 100 control the elevation angle of the beam 115 output from the array antenna 110, by using only the XZ plane. This assumes that the array antenna 110 performs in-phase feeding with respect to the Y-axis direction so that the beam is fixed in the Y-axis direction, that the resulting beam can be emitted toward an elevation direction in which 0 degrees are set with respect to the Z-axis, and that the position of the power receiver 50B is not so deviated from the XZ plane (for example, the elevation angle relative to the Z-axis of the Y-Z plane is approximately in the range of +30 degrees). This is because in a case where the power receiver 50B is situated at the position described above, only by controlling the elevation angle of the beam 115 in the XZ plane, the beam 115 can be efficiently emitted toward the power receiver 50B, and the size of a given control unit in the array antenna 110 is reduced.

The position deriving unit 151 calculates a center of gravity of the image of the marker, based on the pixel index output from the image processor 142B. The pixel index output from the image processor 142B expresses an image obtained by equidistant projection that is performed through the fisheye lens 141. In such image processing, the position P1 that is of the marker included in the image acquired by the camera 140, and that is used in the array antenna 110 is converted into a position P2 that is defined by polar coordinates of the XY plane. In this arrangement, the position deriving unit 151 derives the position P2. The position P1 is a position of the center of gravity, calculated by the position deriving unit 151. The position P2 is an example of a second position.

The position P2 is expressed by a radius vector r from the origin O and a deflection angle φ. When a focal length of the fisheye lens 141 is expressed as $f_L$, the radius vector r is expressed by $r = f_L \theta$. The deflection angle φ is the same as the azimuth angle φ. By the image processing described above, the position deriving unit 151 determines $r \cdot \cos \varphi$ that is obtained by mapping the radius vector r onto the X-axis. The position deriving unit 151 outputs data indicating the position P2 to the elevation-angle acquiring unit 152.

The elevation-angle acquiring unit 152 acquires (calculates), as the elevation angle θa, a value ($r \cdot \cos \varphi / f_L$) that is obtained by dividing an X-coordinate ($r \cdot \cos \varphi$) of a mapped position P2 that is obtained by mapping a position P2a onto the X-axis, by the focal distance $f_L$ of the fisheye lens 141. The reason why the elevation angle θa can be acquired in this manner will be described below. The elevation-angle acquiring unit 152 outputs the elevation angle θa to the distance estimating unit 154 and the control unit 155.

The positional deviation detector 153 determines a shape, and a center of gravity, of the marker 50A, based on the pixel index output from the image processor 142B, and detects a positional deviation between the camera 140 and the marker 50A in the Y-axis direction, based on the position of the center of gravity of the marker 50A that is present in a region. The position of the center of the fisheye lens 141 coincides with each of the center of the 4N antenna elements 111 and the origin of the XYZ coordinate system, for example. In this arrangement, it is sufficient when a position of the center of the gravity in the Y-axis direction, obtained in a case where there is no positional deviation between the camera 140 and the marker 50A is given as Y=0, for example. If a position of the determined center of the gravity of the marker 50A in the region in the Y-axis direction is given as Y=0, the positional deviation detector 153 determines that there is no positional deviation between the camera 140 and the marker 50A. Also, if the position of the determined center of the gravity of the marker 50A that is present in the region in the Y-axis direction is not given as Y=0, the positional deviation detector 153 determines that there is a positional deviation between the camera 140 and the marker 50A, and thus detects that the positional deviation occurs. The positional deviation detector 153 outputs a result of the detection to the distance estimating unit 154. The position of the center of the gravity may be acquired by the position deriving unit 151.

When the elevation angle θa calculated by the elevation-angle acquiring unit 152 is zero degrees (0 degrees), the distance estimating unit 154 estimates a distance from the center of the fisheye lens 141 to the marker 50A, based on the number of pixel indexes output from the image processor 142B in the camera 140. The elevation angle θa of 0 degrees means that the marker 50A exists in front of the fisheye lens 141 in the Z-axis direction (the center of the gravity of the marker 50A exists on the Z-axis).

The distance estimating unit 154 estimates a facing distance $r_{FD}$ that is from the center of the fisheye lens 141 to the marker 50A, in a case where the elevation angle θa is 0 degrees. The facing distance $r_{FD}$ is a distance that is obtained in a case where the marker 50A faces the camera 140 on the Z-axis.

For example, for each of different distances by which the camera 140 and the marker 50A are separated on the Z-axis, the number of binarized pixel indexes that are acquired by the image processor 142B is stored in the memory 156 in advance. Further, in a case where the elevation angle θa is zero degrees (0 degrees), the distance estimating unit 154 counts the number of pixel indexes output from the image processor 142B of the camera 140, and then the distance estimating unit 154 compares a counted value with multiple reference values that correspond to respective facing distances $r_{FD}$ stored in the memory 156, to thereby estimate the facing distance $r_{FD}$ from the center of the fisheye lens 141 to the marker 50A, in the case where the elevation angle θa is 0 degrees. The number of pixel indexes varies depending on the facing distance $r_{FD}$, and thus the facing distance $r_{FD}$ can be estimated based on the number of pixel indexes.

When the elevation angle θa is 0 degrees (0 degrees), in a case where the pixel index is output from the image processor 142B of the camera 140 a plurality of times, the facing distance $r_{FD}$ is sufficiently estimated based on an average of the numbers of pixel indexes.

In addition, when the positional deviation between the camera 140 and the marker 50A occurs in a case where the fisheye lens 141 is used, the number of pixel indexes is reduced in comparison to a case where the positional deviation between the camera 140 and the marker 50A does not occur, even when the same facing distance $r_{FD}$ is obtained. In this arrangement, under a condition in which the positional deviation detector 153 determines that there is a positional deviation between the camera 140 and the marker 50A in the Y-axis direction, it is sufficient when the distance estimating unit 154 estimates the facing distance $r_{FD}$ by using the number of pixel indexes that are obtained by making a correction in accordance with the extent to which the positional deviation occurs in the Y-axis direction, where the distance estimating unit 154 preset stores, in the memory 156, data indicating the extent to which the number of pixel indexes varies.

The control unit 155 controls an amount of phase shift that is caused by each phase shifter 120, such that the direction of the beam 115, emitted by the array antenna 110, defines the elevation angle θa in the XZ plane. The elevation angle θa is acquired by the elevation-angle acquiring unit 152. In addition, the control unit 155 controls the output of the microwave generator 130, and controls the capturing or the like to be performed through the camera 140.

The control unit 155 controls the amount of phase shift that is caused by each phase shifter 120, as described below specifically. The control unit 155 retrieves, from the memory 156, phase data that is in association with the facing distance $r_{FD}$ estimated by the distance estimating unit 154, and the elevation angle θa acquired by the elevation-angle acquiring unit 152. Then, the control unit 155 controls amounts of the phase shift for the N phase shifters 120, based on the retrieved phase data.

Here, in order for the antenna of the power receiver 50B to efficiently receive the power, it is ideal that phases of the transmission power signals, obtained when the power from the N subarrays is received by the antenna of the power receiver 50A, are identical. The antenna device 100A and the feed device 100 transmit the power of the transmission power signals to the power receiver 50B that is located, for example, at a short distance from 3 m to about 7 m. When the power is transmitted to the power receiver 50B that is attached to an inner wall 51 in a tunnel, a distance from the array antenna 110 to the power receiver 50B is, for example, about 3 m to about 5 m, under a condition in which the angle θb is 0 degrees.

The power is assumed to be transmitted at such a short distance, and thus a relative difference between distances that are from the respective N subarrays 110A to the antenna of the power receiver 50B is relatively large. In this case, when the N subarrays 110A transmit the power to the same target, phases of the transmission power signals that are received by the antenna of the power receiver 50B from the N subarrays 110A are not matched, and thus the power receiver 50B cannot efficiently receive the power. The difference between distances that are each from a corresponding subarray, among the N subarrays 110A, to the antenna of the power receiver 50B varies depending on the angle θb and the distance from the corresponding subarray to the antenna of the power receiver 50B, in the Z-axis direction.

In view of the situation describe above, each of the antenna device 100A and the feed device 100 uses phase data used to adjust phases that are obtained when the N subarrays 110A transmit the power, so as to match the phases of the transmission power signals that are from the N subarrays 110A and then are received by the antenna of the power receiver 50B. In order to reduce the effect of the transmission power signals on any other device that may exist around the antenna device 100A and the feed device 100, assuming that the power is transmitted in a case where the angle θb that identifies the marker 50A relative to the antenna devices 100A and the feed device 100 that are moving is within the range, for example, of ±15 degrees, multiple sets of phase data are prepared to adjust amounts of phase shift that are performed through the N subarrays 110A, and each amount of phase shift is set in increments of 1 degrees. The power transmitted within the range of ±15 degrees is an example of power transmitted within a predetermined included angle range. Each phase data includes shift amounts for the N phases to be set by the N phase shifters 120 that are respectively coupled to the N subarrays 110A, in a case where a given elevation angle θa is set. The sets of phase data, namely 31 sets of phase data, are prepared for a given facing distance $r_{FD}$, and the phase data is set in increments of 1 degree within the range of angles θb of +15 degrees to −15 degrees. In order to adjust the shift amounts for the phases for the N subarrays 110A in accordance with each of the facing distances $r_{FD}$, the sets of phase data are prepared for the respective facing distances $r_{FD}$. The phase data is data that is created based on the angle θb, the sets of phase data, from ψ3(θb) to ψ7(θb), are illustrated using θb in FIG. 2. It is sufficient when the control unit 155 uses the multiple sets of phase data that are obtained in a case where the angle θb is equal to the elevation angle θa.

The control unit 155 controls amounts of phase shift for the N phase shifters 120, by using phase data for the angle θb that is equal to the elevation angle θa that is acquired by the elevation-angle acquiring unit 152, and the phase data is obtained by using multiple sets of phase data that are in association with facing distances $r_{FD}$ estimated by the distance estimating unit 154.

Further, the control unit 155 controls transmitted power of the transmission power signals to be smaller than or equal to predetermined power. This is because interference of the transmission power signals with any other device that may exist around the power receiver 50B is reduced. The predetermined power is upper-limit power that does not influence (interfere with) the other device. In view of the effect of the transmission signals on any other device, namely a portable mobile station such as a smartphone or a transceiver, in order to set the transmitted power to be smaller than or equal to the predetermined power that is obtained by adding a limitation under a constraint on received power of the other device, the control unit 155 reads out transmitted power data that is stored in the memory 156 to set transmitted power of the transmission power signals. Also, in an example, the transmitted power of the transmission power signals may be set in accordance with five facing distances $r_{FD}$ of 3 m, 4 m, . . . 7 m.

The memory 156 is an example of a storage. The memory 156 stores a program to be executed when the position deriving unit 151, the elevation-angle acquiring unit 152, and the control unit 155 perform processing. The memory 156 stores data to be used when the program is executed, data to be generated when the program is executed, and image data or the like that is acquired by the camera 140. The memory 156 also stores multiple sets of phase data for respective facing distances $r_{FD}$, and stores transmission power data. In an example, for each of five facing distances $r_{FD}$ of 3 m, 4 m, . . . and 7 m, 31 sets of phase data are stored in one-degree increments for a range of angles θb from +15 degrees to −15 degrees. In addition, the memory 156 stores transmitted power data that enables reductions in interference with any other device that may exist around the power receiver 50B. That is, the memory 156 stores the transmitted power data indicating an upper-limit value of the transmitted power that is obtained by adding a limitation under a constraint on received power of any other device. The upper-limit value of the transmitted power is an example of predetermined power. In an example, five upper-limit values of the transmitted power may be respectively stored for the five facing distances $r_{FD}$ of 3 m, 4 m, . . . and 7 m.

Hereinafter, a method for determining the elevation angle θa is described.

When the azimuth angle φ and the elevation angle θ are used, the elevation angle θa can be determined by Equation (1) below, in view of a geometric relationship between the position P1 and the position P1a.

[Math. 1]

$$\theta a = \frac{\pi}{2} - \tan^{-1}\left\{\frac{1}{\cos\phi}\tan\left(\frac{\pi}{2}-\theta\right)\right\} \quad (1)$$

When Equation (1) is expanded, Equation (2) is obtained.

[Math. 2]

$$\tan\theta a = \cos\phi\tan\theta \quad (2)$$

Here, when the elevation angle θ is sufficiently small, tan θ≈θ is given. When the azimuth angle φ is close to 90 degrees, cos φ≈1 is given. When the azimuth angle φ is close to 90 degrees, cos φ≈0 is given. In this case, Equation (2) can be transformed into Equation (3) below.

[Math. 3]

$$\theta a = \theta \cos\phi \quad (3)$$

In other words, when the position of the power receiver 50B is not significantly deviated from the XZ plane, the elevation angle θa can be approximated as expressed by Equation (3).

As described above, when the focal length of the fisheye lens 141 is expressed as fL, the radius vector r is expressed by Equation (4) below.

[Math. 4]

$$r = f_L\theta \quad (4)$$

From Equations (3) and (4), the elevation angle θa can be expressed by Equation (5) below.

[Math. 5]

$$\theta a = r\cdot\cos\phi/f_L \quad (5)$$

With this approach, the elevation angle θa can be approximately determined using Equation (5).

Figure 4:
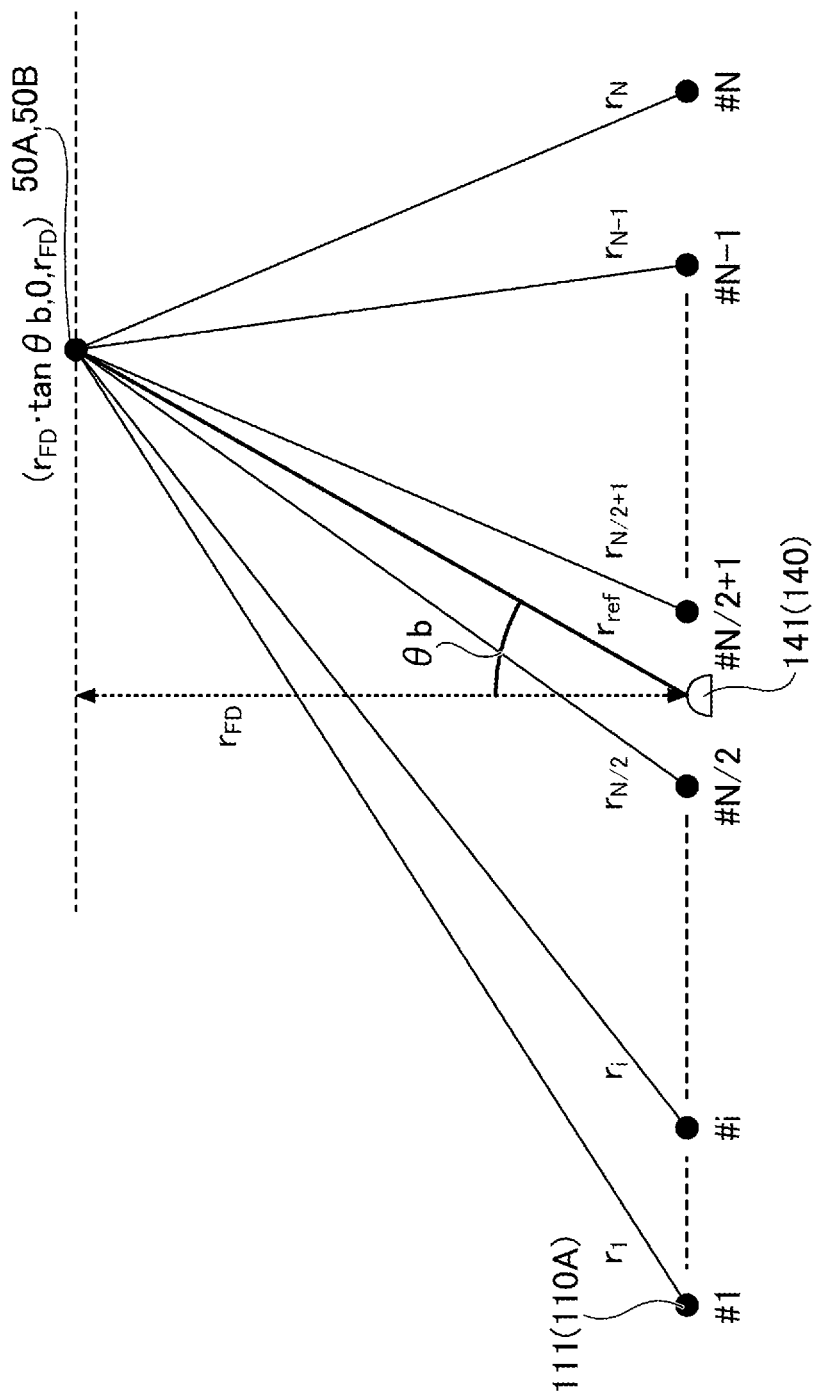
FIG. 4 is a diagram for describing an approach to determine phase data.

Hereinafter, the method for determining the phase data will be described. FIG. 4 is a diagram for describing an approach to determine the phase data. FIG. 4 illustrates the fisheye lens 141 of the camera 140, the marker 50A, the power receiver 50B, and the N antenna elements 111. Each antenna element 111 is a given antenna element of four antenna elements 111 that are included in each of the N subarrays 110A. The position of the marker 50A is the same as the position of the power receiver 50B.

As illustrated in FIG. 4, distances from N subarrays 110A to the marker 50A are respectively given as r1 to rN. Here, in order to simplify the description, it is assumed that there is no positional deviation between the camera 140 and the marker 50A in the Y-axis direction. The center of the 4N antenna elements 111 coincides with the origin of the XYZ coordinate system, and thus coordinates of the center of the 4N antenna elements 111 are expressed as (X,Y,Z)=(0,0,0). In addition, there is no positional deviation between the camera 140 and the marker 50A in the Y-axis direction, and the facing distance is given as $r_{FD}$. In this arrangement, the angle of the power receiver 50B that is obtained when viewed from the fisheye lens 141 is expressed as θb. The position of the power receiver 50B can be expressed as (X, Y, Z)=($r_{FD}$ tan θb,0,$r_{FD}$). Here, when the distance from the fisheye lens 141 to the power receiver 50B is expressed as $r_{ref}$, the distance $r_{ref}$ can be expressed by Equation (6) below.

[Math. 6]

$$r_{ref} = \sqrt{(r_{FD} \cdot \tan \theta b)^2 + 0^2 + r_{FD}^2} \quad (6)$$

When the position of the i-th antenna element III among the N antenna elements 111 is expressed as (X,Y,Z)=($d_i$,0,0), a distance ri from an i-th antenna element 111 to the power receiver 50B can be expressed by Equation (7) below.

[Math. 7]

$$r_i = \sqrt{(r_{FD} \cdot \tan \theta b - d_i)^2 + 0^2 + r_{FD}^2} \quad (7)$$

With this approach, a path difference ri between the distance $r_{ref}$ from the fisheye lens 141 to the power receiver 50B, and the distance ri from the i-th antenna element 111 to the power receiver 50B can be expressed by Equation (8) below.

[Math. 8]

$$\tau_i = r_i - r_{ref} \quad (8)$$

The path difference ri is expressed in meters. In this case, when the path difference ri is converted into a wavelength λ of a microwave to be used, a phase difference ψi can be determined by Equation (9).

[Math. 9]

$$\psi_{r_{FD},i}(\theta_b) = 2\pi \cdot \frac{\mathrm{mod}\,(\tau_i, \lambda)}{\lambda} \quad (9)$$

$-\psi_{r_{FD}i}(\theta b)$ that is obtained by inverting a sign of the phase difference expressed by Equation (9) is given as a phase that is set for a given phase shifter 120 that is used in a case where the power is transmitted by the i-th antenna 111. It is sufficient when multiple sets of phase data used for multiple elevation angles θa are prepared for the N subarrays 110A to be stored in the memory 156. Further, it is sufficient when the multiple sets of phase data for multiple facing distances $r_{FD}$ are prepared to be stored in the memory 156. With use of the multiple sets of phase data, the transmission power signals transmitted by the N subarrays 110A can reach the power receiver 50B in the same phase. The multiple sets of phase data for multiple angles θb are expressed by Equation (10) below.

[Math. 10]

$$\psi_{r_{FD}}(\theta b) = \{-\psi_{r_{FD},1}(\theta b), \ldots, -\psi_{r_{FD},N}(\theta b)\} \quad (10)$$

It is sufficient when the control unit 155 sets the shift amounts for the N phase shifters 120 that are coupled to the N subarrays 110A, respectively by using phase data indicating the angle θb that corresponds to the elevation angle θa.

Figure 5:
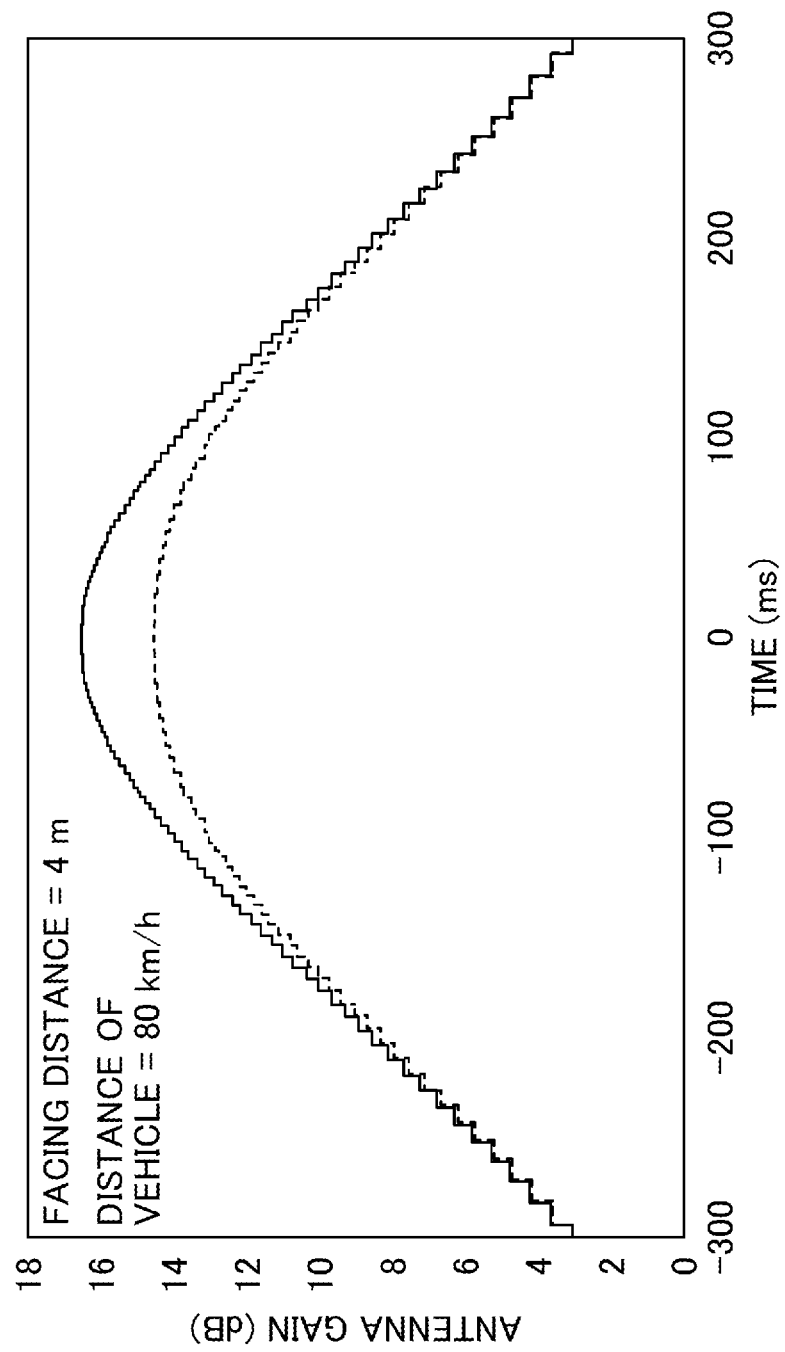
FIG. 5 is a diagram illustrating antenna gains of an antenna device 100A and the feed device 100.

FIG. 5 is a diagram illustrating an antenna gain for the antenna device 100A and the feed device 100. FIG. 5 is the diagram illustrating the antenna gain that is obtained in a case where the power is received by the antenna of the power receiver 50B, where the facing distance rFD is 4 m, and the speed of the vehicle on which the antenna device 100A and the feed device 100 are mounted is 80 km/h. The horizontal axis represents the time, where 0 ms (milliseconds) is the time at which the elevation angle θa becomes 0 degrees, −300 ms is the time at which the elevation angle θa becomes +70 degrees, and +300 ms is the time at which the elevation angle θa becomes −70 degrees. That is, the time on the horizontal axis corresponds to the elevation angle θa. The time at which the elevation angle θa becomes +15 degrees is about −65 ms, and the time at which the elevation angle θa becomes −15 degrees is about +65 ms.

In FIG. 5, a solid line expresses the antenna gain in a case where the shift amounts for the phase shifters 120 are adjusted using phase data that is obtained based on a facing distance and an elevation angle for each of the antenna device 100A and the feed device 100. A broken line expresses the antenna gain in a case where phase data that is obtained based on only an elevation angle is used for comparison. The antenna gain obtained based on only the elevation angle is an antenna gain obtained in the power receiver 50B, in a case where the shift amounts for the N phase shifters 120 that are coupled to the N subarrays 110A are each set to a value that corresponds to the elevation angle θa.

As illustrated in FIG. 5, the antenna gain that is obtained based on a given facing distance and a given elevation angle is larger than or equal to the antenna gain that is obtained based on only the elevation angle. A difference between the antenna gain obtained based on the given facing distance and the given elevation angle, and the antenna gain obtained based on only the elevation angle is increased as a time zone becomes closer to 0 ms (in accordance with a decreasing elevation angle θa). As the elevation angle θa becomes closer to 0 degrees, a distance between the N subarrays 110A and the power receiver 50B becomes shorter. As a result, it is considered that a remarkable effect of an individual phase control for the N subarrays 110A that is performed based on the facing distance and the elevation angle is obtained.

In view of the above situation, a range of about −65 ms to about +65 ms in which the elevation angle θa is within the range of ±15 degrees is a range in which the largest antenna gain is obtained and the highest efficiency in transmitting the power is obtained. Further, the range of about −65 ms to about +65 ms is a range in which the largest difference from an antenna gain for comparison is obtained. In addition, by transmitting the transmission power signal within the range of about −65 ms to about +65 ms, a time period required to transmit the power can be shortened compared to a case where the transmission power signal is transmitted within the range of −300 ms to +300 ms. Increased power transmission efficiency for the antenna device 100A results in a large amount of power that is received by the power receiver 50B. For this reason, by transmitting the transmission power signals over a short time period that allows for the increased power transmission efficiency, power can be efficiently received by the power receiver 50B, a time period in which power is received can be reduced, and the effect of the transmission power signals on any other device that may exist around the power receiver 50B can be reduced.

In addition, in a simulation, it is confirmed that when the power is transmitted within a range (for example, a range of 30 degrees or larger) where an absolute value of the elevation angle θa is great in the tunnel, more reflection occurs, and less reflection occurs in the range of ±15 degrees. In this situation, the power transmission that is performed over an included angle range, such as the range of ±15 degrees, can reduce the effect of a reflected wave on any other device that may be present around the power receiver 50B.

<Low Sidelobes of Beam>

FIG. 6 is a diagram for describing low sidelobes of the beam 115 emitted by the array antenna 110. In each of FIGS. 6(A) and 6(B), the horizontal axis expresses the angle (degrees), and the vertical axis expresses the gain (dB). From the viewpoint of allowing for both efficiency in powering the power receiver 50B and reductions in the effect of the transmission power signals on any other device that may exist around the power receiver 50B, low sidelobes are formed for the beam 115 emitted by the array antenna 110.

In FIG. 6(A), the directivity for a horizontal direction, obtained when the beam 115 is emitted by the array antenna 110 in the horizontal direction of 0 degrees (positive Z-axis direction), is expressed by a solid line. The directivity for a vertical direction is expressed by a broken line. As seen from the directivity for the horizontal direction illustrated in FIG. 6(A), gains with respect to sidelobes at both sides are each reduced, compared to a main lobe that is obtained in the direction of 0 degrees. For the directivity for the vertical direction, a uniform distribution with respect to 0 degrees is provided.

In FIG. 6(B), in a case where the beam 115 is emitted by the array antenna 110 in a horizontal direction of +15 degrees (direction indicated by the angle θb of +15 degrees with respect to the positive Z-axis direction), the directivity for the horizontal direction is expressed by the solid line, and the directivity for the vertical direction is expressed by the broken line. As seen from the directivity with respect to the horizontal direction illustrated in FIG. 6(B), gains for the respective sidelobes are reduced, compared to the main lobe that is obtained with respect to about +15 degrees. For the directivity for the vertical direction, a uniform distribution with respect to 0 degrees is provided.

Such low sidelobes of the beam 115 can be provided, for example, by weighting amplitudes or power of the transmission power signals transmitted from the N subarrays 110A by a Taylor distribution (window function).

<Power is Continuously Transmitted Over Included Angle Range Multiple Times>

Figure 7:
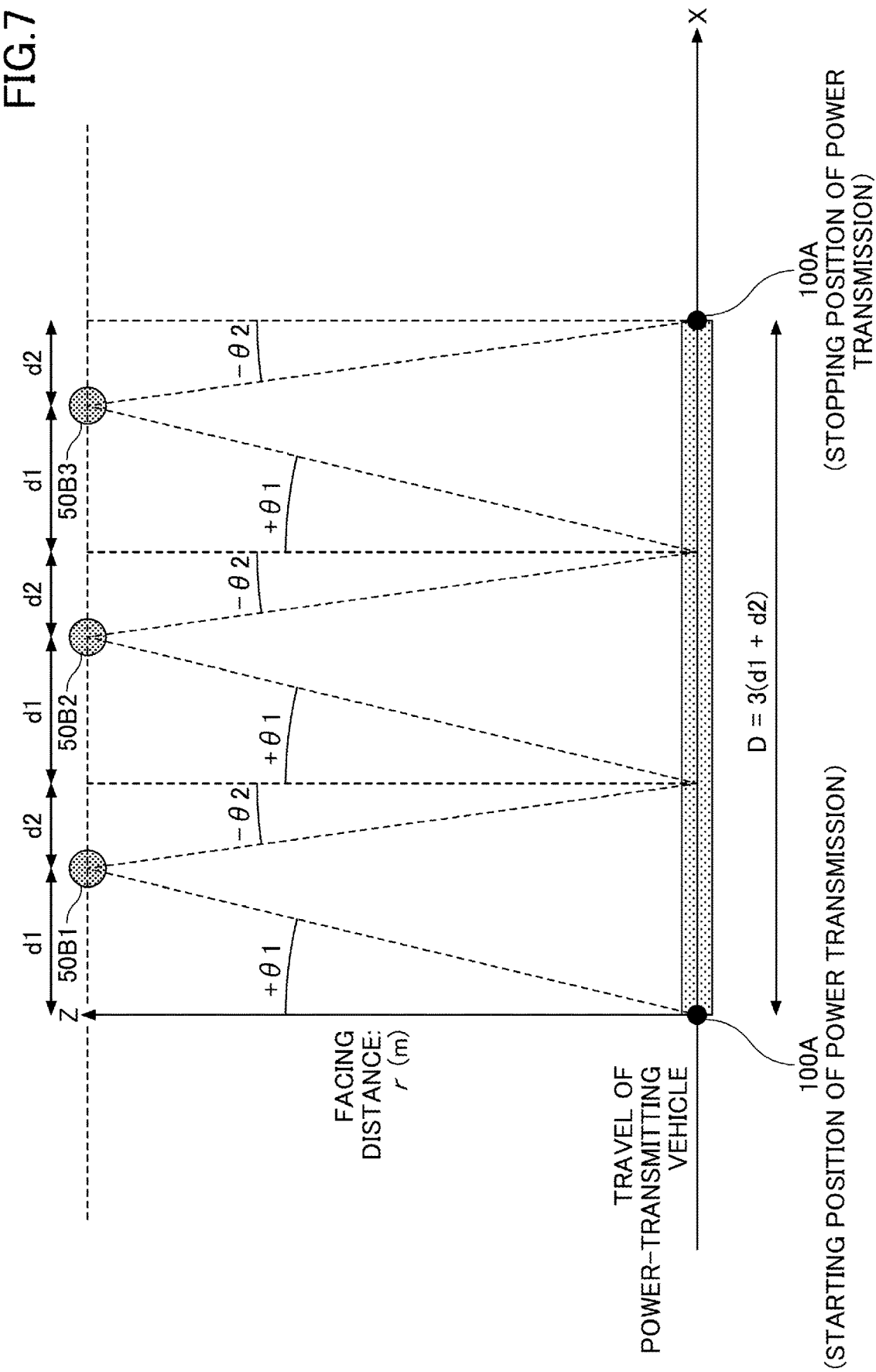
FIG. 7 is a diagram for describing power that is continuously transmitted over an included angle range from the antenna device 100A to a power receiver 50B, a plurality of times.

FIG. 7 is a diagram for describing the power that is continuously transmitted over the included angle range, from the antenna device 100A to the power receiver 50B a plurality of times. In FIG. 7, the positive X-axis direction is a direction in which a working vehicle (power-transmitting vehicle) with the antenna device 100A travels in a tunnel. The antenna device 100A starts transmitting transmission power signals at a starting position of power transmission, and then stops the transmitting of the transmission power signals at a stopping position of the power transmission. In an example, a case where the power is continuously transmitted over the included angle range, three times, during a period from the starting position of the power transmission to the stopping position of the power transmission, will be described as follows. FIG. 7 shows the antenna device 100A at each of the starting position of the power transmission and the stopping position of the power transmission.

FIG. 7 shows three power receiving antennas 50B1, 50B2, and 50B3 of the power receiver 50B. In the figure, it is assumed that the power receiver 50B includes the three power receiving antennas 50B1, 50B2, and 50B3, and one marker 50A is provided for each of the three power receiving antennas 50B1, 50B2, and 50B3. In FIG. 7, the marker 50A is omitted.

A battery or the like is charged by the power received by the three power receiving antennas 50B1 to 50B3 of the power receiver 50B. The power receiving antennas 50B1 to 50B3 are arranged at equal intervals in this order, when viewed from the negative X-axis direction to the positive X-axis direction. An interval between given power receiving antennas, among the power receiving antennas 50B1 to 50B3, is set by d1+d2.

The facing distance from the antenna device 100A to each of the three power receiving antennas 50B1 to 50B3 in the power receiver 50B is given as r(m). The facing distance r(m) is, for example, from 3 m to 7 m. A position that is at a distance d2 after a power receiving antenna 50B1 is a position that is at a distance d1 before a power receiving antenna 50B2. A position that is at the distance d2 after a power receiving antenna 50B2 is a position that is at a distance d1 before a power receiving antenna 50B3. The power receiving antennas 50B1 to 50B3 are arranged in this manner to enable the power to be continuously transmitted over the included angle range three times.

A distance D from the starting position of the power transmission to the stopping position of the power transmission is given by D=3(d1+d2), where for example, d1>d2 is satisfied. In this case, at a position at which the antenna device 100A starts the transmission, and that is before each of the power receiving antennas 50B1 to 50B3 in the X-axis direction, a corresponding power receiving antenna, among the power receiving antennas 50B1 to 50B3, is located in an angle direction of +θ1. The angle of +θ1 is an example of a first angle range that is set on a first side with respect to the +Z-axis direction. The positive Z-axis direction is a frontal direction of the antenna device 100A. At a position where the antenna device 100A stops the transmission that is performed through the power receiving antennas 50B1 to 50B3, each of the power receiving antennas 50B1 to 50B3 is located in an angle direction of −θ2. The angle of −θ2 is an example of a second angle range that is set on a second side with respect to the positive Z-axis direction. Each of the angles of +θ1 and −θ2 corresponds to the above angle of θb.

Each of the angle of +θ1 and the angle of −θ2 is in a predetermined included angle range. When the focal distance $f_L$ of the fisheye lens 141 is used, $d1=f_L\theta1$ is satisfied, and $d2=f_L\theta2$ is satisfied.

In FIG. 7, for example, d1>d2 is satisfied, and an absolute value of the angle of +θ1 is greater than an absolute value of the angle of −θ2. However, the angle of +θ1 and the angle of −θ2 may be equal to each other, or each angle may be in the range of ±15 degrees described above.

In the X-axis direction, the antenna device 100A sets the angle of the beam 115 to +θ1 at the starting position of the power transmission that is at the distance d1 before the power receiving antenna 50B1, and then the antenna device 100A starts transmitting the power. Subsequently, the antenna device 100A continuously changes the angle of the beam 115 to −θ2, and then stops transmitting the power to the power receiving antenna 50B1, at a position that is at the distance d2 after the power receiving antenna 50B1. The position that is at the distance d2 from the power receiving antenna 50B1 is a position that is at the distance d1 before the power receiving antenna 50B2. In this case, without stopping the power transmission, the antenna device 100A sets the angle of the beam 115 to +θ1 at a position where the transmitting of the power to the power receiving antenna 50B1 is to be terminated, then emits the beam 115 toward the power receiving antenna 50B2, and finally transmits the power to the power receiving antenna 50B2.

The antenna device 100A continuously changes the angle of the beam 115 from +θ1 to −θ2, and then terminates the transmitting of the power transmission to the power receiving antenna 50B2, at a position that is at the distance d2 ahead of the power receiving antenna 50B2. The position that is at the distance d2 after the power receiving antenna 50B2 is a position that is at the distance d1 before the power receiving antenna 50B3. In this case, without stopping the power transmission, the antenna device 100A sets the angle of the beam 115 to +θ1 at a position where the transmitting of the power to the power receiving antenna 50B2 is to be terminated, then directs the beam 115 to the power receiving antenna 50B3, and finally transmits the power to the power receiving antenna 50B3. Then, while continuously changing the angle of the beam 115 from +θ1 to −θ2, the antenna device 100A terminates the power transmission at the stopping position of the power transmission that is at the distance d2 after the power receiving antenna 50B3.

With this approach, while the angle of the beam 115 is changed in accordance with the traveling of the power-transmitting vehicle that is performed between the starting position of the power transmission and the stopping position of the power transmission, the transmitting of the power to the power receiving antennas 50B1 to 50B3 is continuously performed three times over the included angle range. Such power transmission is continuously performed three times without any time interval. At both a timing at which the angle of the beam 115 is changed from −θ2 to +θ1 to transmit the power to the power receiving antenna 50B2 after the completion of the power transmission to the power receiving antenna 50B1; and a timing at which the angle of the beam 115 is changed from −θ2 to +θ1 to transmit the power to the power receiving antenna 50B3 after the completion of the power transmission to the power receiving antenna 50B2, the use of the beam 115 may be temporarily stopped. Even in such a case, the power transmission is continuously performed three times without any time interval, and thus emission of the beam 115 over the included angle range is continuously performed a plurality of times.

In order to enable such continuous emission of the beam 115 to be performed over the included angle range a plurality of times, it is sufficient when the three power receiving antennas 50B1 to 50B3 of the three power receivers 50B are arranged along the X-axis such that the emission of the beam 115 over the included angle range can be continuously performed a plurality of times. More specifically, it is sufficient when an interval between given power receiving antennas among the three power receiving antennas 50B1 to 50B3, travel speed of the antenna device 100A, and the included angle range are set such that the control unit 155 can control the phase shifters 120 three times continuously based on phase data that is obtained in light of the three power receiving antennas 50B1 to 50B3.

<ROI Control>

Figure 8:
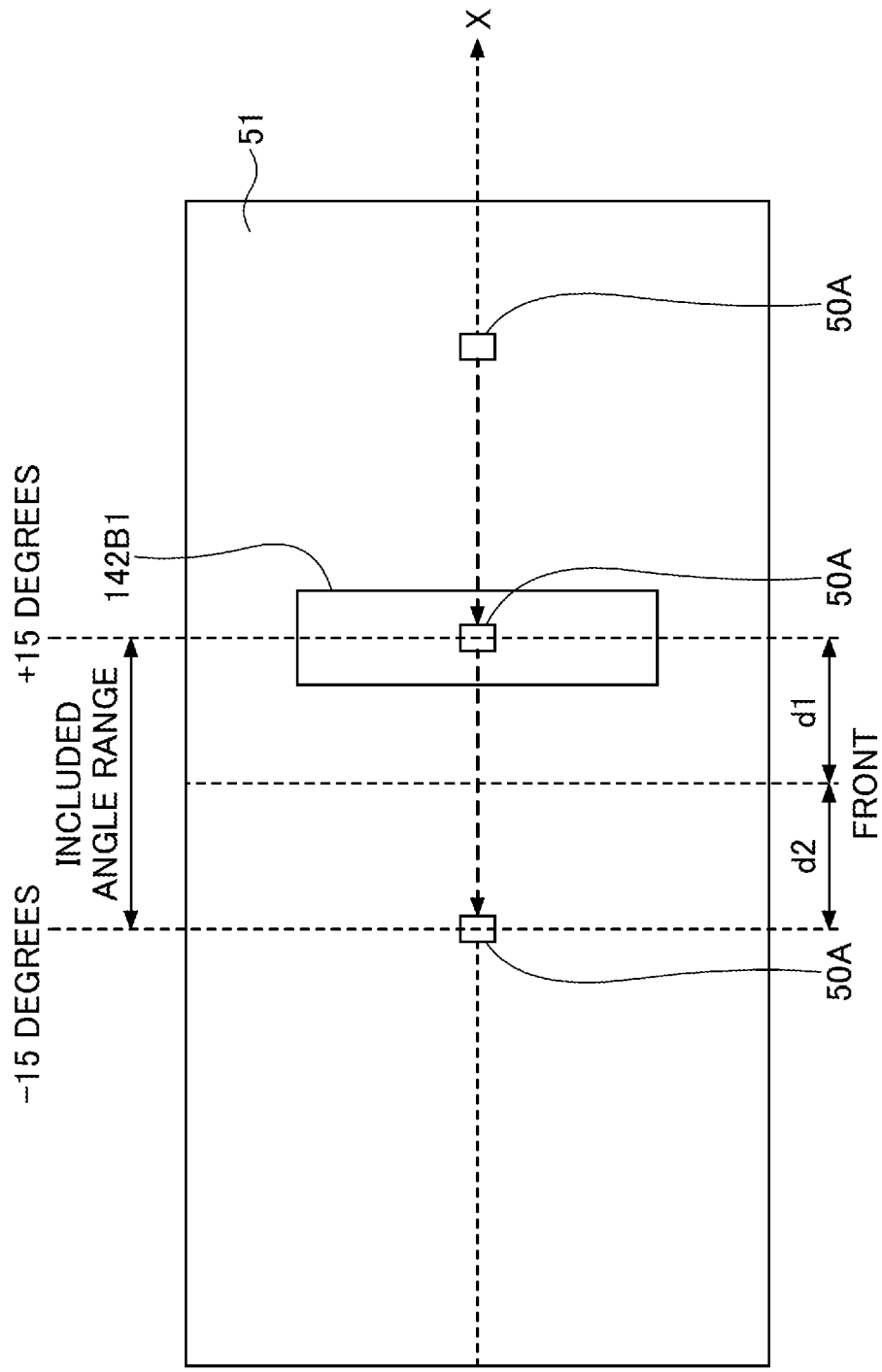
FIG. 8 is a diagram illustrating a region 142B1 that an image processor 142B is set with respect to image data under ROI control.

FIG. 8 is a diagram illustrating a region 142B1 that the image processor 142B sets by ROI control. FIG. 8 illustrates an inner wall 51 of the tunnel, and three markers 50A, in an image that is acquired by the capturing unit 142A. In this figure, the power receiver 50B includes three power receiving antennas, and one marker 50A is provided with each power receiving antenna. In a case where the angle θb with respect to the frontal direction (positive Z-axis direction) of the antenna device 100A is in a predetermined included angle range of ±15 degrees, the image processor 142B sets the region 142B1 that is a target to be detected from the image acquired by the capturing unit 142A, under the ROI control.

While the working vehicle on which the antenna device 100A is mounted is traveling, the image processor 142B sets a region 142B1 in the direction of +15 degrees, and stands by. When the marker 50A enters the region 142B1, the image processor 142B causes the region 142B1 to follow the marker 50A, and the image processor 142B is moving the marker 50A in the negative X-axis direction until the range of −15 degrees is reached. When the region 142B1 reaches the direction of −15 degrees, the tracking is stopped, and the region 142B1 is set to the direction of +15 degrees to stand by. With this approach, the image processor 142B repeatedly performs the process of following the marker 50A using the region 142B1. While the marker 50A is captured in the region 142B1, the image processor 142B outputs a capture signal indicating that the marker is captured to the control unit 155.

While receiving captured signals from the image processor 142B, the control unit 155 transmits transmission power signals. Then, when there is no capture signal to be received, the control unit 155 stops transmitting the power. In this arrangement, a position at which the angle θb of +15 degrees with respect to the frontal direction of the antenna device 100A is formed is a position at which the image processor 142B starts capturing the marker 50A, and the position is a starting position of the power transmission at which the control unit 155 starts transmitting the power. With regard to the inner wall 51 of the tunnel, a distance between a front surface of the antenna device 100A and the position at which the angle θb of +15 degrees is formed is d1. A position at which the angle θb of −15 degrees on a front side of the antenna device 100A is formed is a position at which the image processor 142B stops capturing the marker 50A, and the position is a stopping position of the power transmission at which the control unit 155 stops transmitting the power. With respect to the inner wall 51 of the tunnel, a distance between the front surface of the antenna device 100A and the position at which the angle θb of −15 degrees is formed is d2.

<Emission Angle Pattern>

Figure 9:
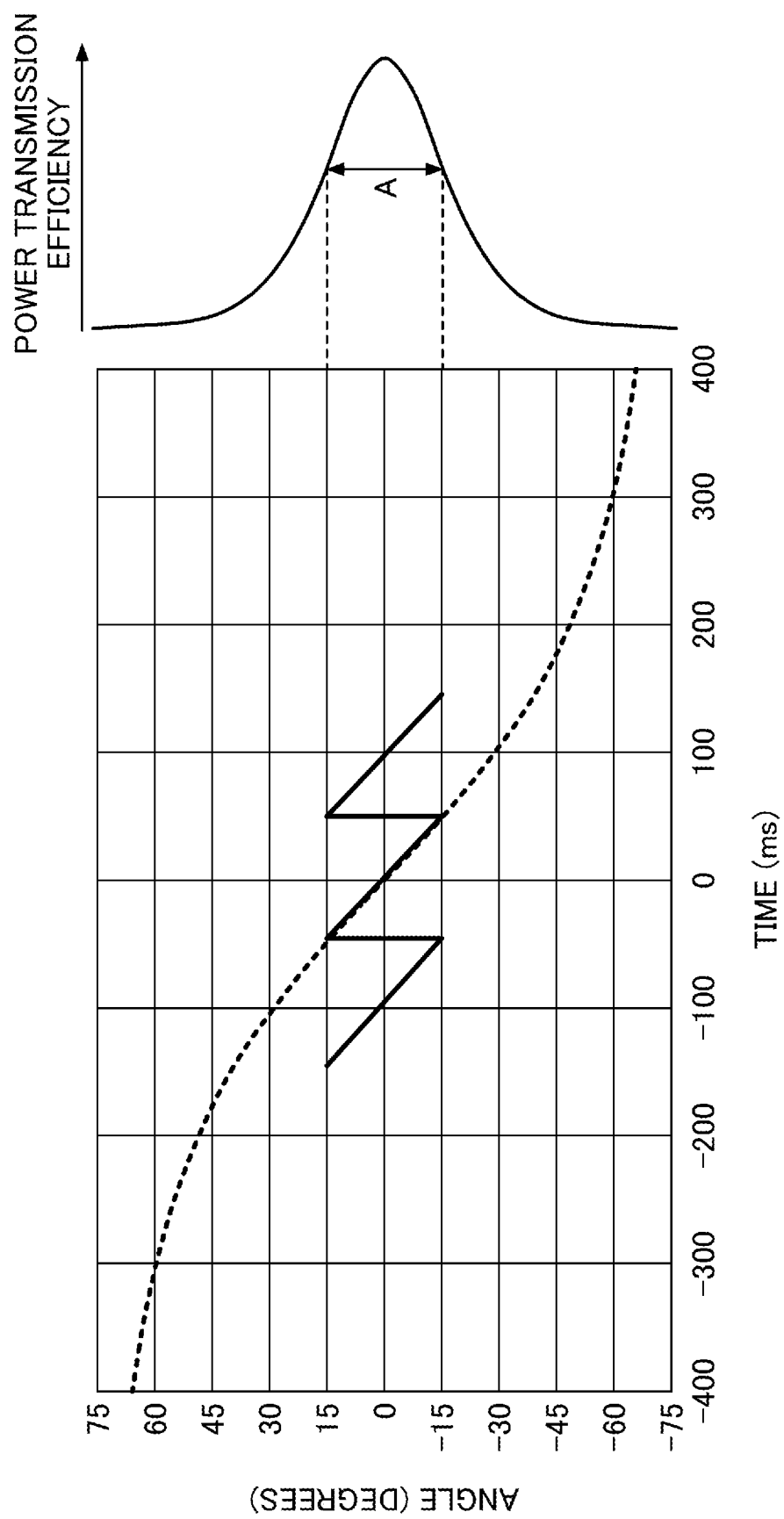
FIG. 9 is a diagram illustrating an example of an emission angle pattern for transmission power signals that are output from an antenna device 100A.

FIG. 9 is a diagram illustrating an example of an emission angle pattern for the transmission power signals output from the antenna device 100A. In FIG. 9, the horizontal axis expresses the time (ms), and the vertical axis on the left part expresses the angle (degrees) of the beam 115. The time on the horizontal axis is 0 (ms) when the angle of the beam 115 becomes 0 degrees. The right part of FIG. 9 illustrates power transmission efficiency with respect to the angle of the beam 115.

In FIG. 9, the emission angle pattern for the transmission power signals output from the antenna device 100A is expressed by the solid line, and an emission angle pattern for comparison is expressed by the broken line. The emission angle pattern for comparison is an emission angle pattern in which power is transmitted from −400 ms to +400 ms, such that the angle of the beam 115 is changed from +70 degrees to −70 degrees with respect to one power receiving antenna.

The emission angle pattern for the transmission power signals output from the antenna device 100A is an emission angle pattern in which power is continuously transmitted in a case where the three power receiving antennas 50B1 to 50B3 are provided on the inner wall 51 of the tunnel as illustrated in FIG. 7. The three markers 50A are provided with the three power receiving antennas 50B1 to 50B3, respectively, as illustrated in FIG. 8.

It is assumed that the power receiving antennas 50B1 to 50B3 are arranged such that θ1 is +15 degrees and −θ2 is −15 degrees in FIG. 7. This corresponds to the arrangement of the three markers 50A described in FIG. 8.

The control unit 155 outputs the transmission power signal to each of the power receiving antennas 50B1 to 50B3 over the included angle range of +15 degrees to −15 degrees, three times, where the power receiving antennas 50B1 to 50B3 are used in this order. With this approach, as illustrated in FIG. 9, the emission angle pattern in which the antenna device 100A transmits the transmission power signals to the power receiving antennas 50B1 to 50B3 becomes an emission angle pattern in which during a time period from about −140 ms to about 140 ms, power is continuously transmitted three times over the included angle range of +15 degrees to −15 degrees. Such an emission angle pattern is enabled by the ROI control.

As illustrated on the right part of FIG. 9, power transmission efficiency is low in a case where the angle of the beam 115 is large, and the highest power transmission efficiency is obtained in a case where the angle of the beam 115 is 0 degrees. The included angle range of +15 degrees to −15 degrees corresponds to a range expressed by a double-headed arrow A, and the included angle range of +15 degrees to −15 degrees is a range in which the power transmission efficiency is very high. The included angle range is a high efficiency range in which the power transmission efficiency is a predetermined value or greater. Further, in the included angle range, a time period in which power is transmitted is extremely short is obtained, compared to the emission angle pattern for comparison.

When the power is transmitted in the emission angle pattern in which the power is continuously transmitted three times over the included angle range of +15 degrees to −15 degrees, the power is repeatedly transmitted in the range that allows for high power transmission efficiency, and the power can be transmitted over a short time period.

<Amount of Received Power>

Figure 10:
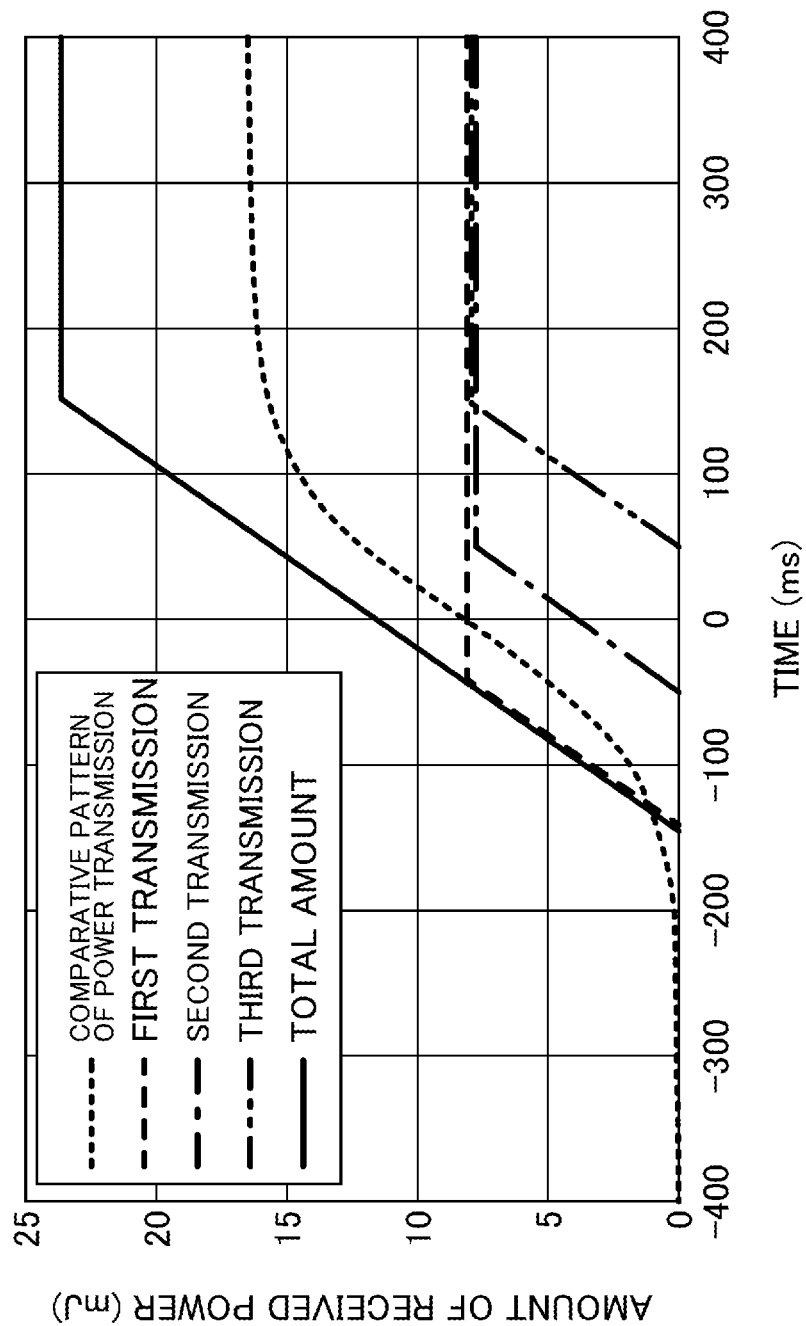
FIG. 10 is a diagram illustrating an amount of received power of the power receiver 50B that is obtained using the emission angle pattern according to the embodiment, including an amount of received power that is using an emission angle pattern for comparison.

FIG. 10 is a diagram illustrating an amount of received power by the power receiver 50B that is obtained using the emission angle pattern according to the embodiment, including an amount of received power that is obtained using the emission angle pattern for comparison. In FIG. 10, the horizontal axis expresses the time (ms), and the vertical axis expresses the amount of received power (mJ). FIG. 10 illustrates amounts of received power obtained by transmitting the power the first, second, and third time, in the emission angle pattern according to the embodiment, and illustrates a total amount of received power obtained by transmitting the power the first, second, and third time. FIG. 10 also illustrates an amount of received power obtained using the emission angle pattern for comparison. The power transmitted in the emission angle pattern according to the embodiment is equal to the power transmitted in the emission angle pattern for comparison. Each transmitted power is maintained at a constant value, over time.

When the power is transmitted the first, second, and third time, the transmitted power reaches the power receiving antennas 50B1, 50B2, and 50B3. A total amount of received power means a total of power received by the three power receiving antennas 50B1 to 50B3 of the power receiver 50B. The amount of received power that is obtained using the emission angle pattern for comparison corresponds to power received by one power receiving antenna that is arranged at the same position as the power receiving antenna 50B2.

As illustrated in FIG. 10, the amount of received power according to the emission angle pattern for comparison is very small in the range of −400 ms to −200 ms where the power transmission efficiency is low, while the amount of received power is rapidly increased in the range of about −100 ms to about 100 ms, which allows for high power transmission efficiency. After 200 ms at which the power transmission efficiency becomes low again, the amount of received power is maintained constantly. Thus, in the emission angle pattern for comparison, the low power transmission efficiency is obtained in a broader range, and a long time period to transmit the power is required. The final received power is about 16.5 mJ.

In contrast, in the emission angle pattern according to the embodiment, the first power transmission starts at about −140 ms, the first power transmission is switched to the second power transmission at about −45 ms, then the second power transmission is switched to the third power transmission at about 45 ms, and subsequently the third power transmission stops at about 140 ms. The amounts of received power that is obtained by transmitting the power three times are substantially identical, and each amount is about 8 mJ. A total amount of received power that is performed three times is about 24 mJ.

As described above, the emission angle pattern according to the embodiment allows for a short time period and a large amount of received power, in comparison to the emission angle pattern for comparison. One power transmission requires about 90 ms, and the amount of received power is about 8 mJ. When the power is transmitted two times, the amount of received power becomes about 16 mJ, which is a similar amount of received power to the amount (about 16.5 mJ) of received power that is obtained using the emission angle pattern for comparison. In addition, when the power is transmitted three times using the emission angle pattern according to the embodiment, the amount of received power becomes about 24 mJ, which is about 1.5 times the amount (about 16.5 mJ) of received power that is obtained using the emission angle pattern for comparison. The time required to transmit the power can be reduced to about 280 ms, i.e., about one-third of 800 ms that is obtained using the emission angle pattern for comparison.

As described above, when the elevation angle of the beam 115 from the array antenna 110 is controlled using only the XZ plane, the position P1 that is obtained by equidistant projection is converted into polar coordinates on a plane parallel to the XY plane, to thereby determine the position P2. Subsequently, the X-coordinate (r·cos φ) of a mapped position P2a that is obtained by mapping the position P2 onto the X-axis is divided by the focal distance $f_L$ of the fisheye lens 141, to thereby determine the elevation angle θa (=r·cos φ/$f_L$).

Further, it is sufficient when the control unit 155 uses the angle θb corresponding to the elevation angle θa to set shift amounts for the N phase shifters 120 that are coupled to the N subarrays 110A, respectively. When the shift amounts for the N phase shifters 120 are controlled using phase data that is set in accordance with changes in the elevation angle θa that is set in accordance with the movement of the antenna device 100A and the feed device 100, the power of transmission signals from the N subarrays 110A that are to constantly reach the antenna of the power receiver 50B in the same phase can be transmitted, while the antenna device 100A and the feed device 100 are moving.

Further, by transmitting the power over the included angle range that covers the frontal direction of the antenna device 100A, the power can be efficiently transmitted in a short time period, over a range that allows for high power transmission efficiency. In addition, the power receiver 50B can efficiently receive the power in a short time period, over a range that allows for high power reception efficiency.

In this arrangement, the antenna device 100A and the feed device 100 can be provided to enable power to be transmitted such that a power receiver efficiently receives the power even in a case where the power receiver is at a short distance from the antenna device 100A and the feed device 100.

The memory 156 stores multiple sets of phase data, for respective facing distances $r_{FD}$, and the distance estimating unit 154 estimates facing distances $r_{FD}$. With this arrangement, shift amounts for the N phase shifters 120 that are coupled to the N subarrays 110A can be set using the multiple sets of phase data in association with the facing distances rFD. Thus, by use of the multiple sets of phase data that are in accordance with distances to the power receiver 50B in the Z-axis direction, the antenna device 100A and the feed device 100, which are capable of transmitting the power such that a power receiver can efficiently receive the power even in a case where the power receiver is at a short distance from the antenna device 100A and the feed device 100, can be provided. For example, in a case where multiple sets of phase data in association with facing distances $r_{FD}$ do not exist, it is sufficient when phase data in association with the closest facing distance $r_{FD}$ to an estimated facing distance $r_{FD}$ is used.

When the positional deviation detector 153 detects a positional deviation between the camera 140 and the marker 50A in the Y-axis direction, and the positional deviation occurs, the distance estimating unit 154 retrieves, from the memory 156, data indicating the extent to which the number of pixel indexes changes in accordance with the positional deviation in the Y-axis direction, and then estimates a given facing distance $r_{FD}$ by using the number of pixel indexes that is obtained by making a correction in accordance with the extent to which the positional deviation occurs in the Y-axis direction. With this arrangement, when there is the positional deviation between the camera 140 and the marker 50A in the Y-axis direction, the control unit 155 uses multiple sets of phase data that is in accordance with facing distances $r_{FD}$ that are estimated using the corrected number of pixel indexes. With this approach, even when there is a positional deviation between the camera 140 and the marker 50A in the Y-axis direction, the antenna device 100A and the feed device 100 can be provided to enable the power to be transmitted such that a power receiver can efficiently receive the power based on a given distance to the power receiver 50B in the Z-axis direction, even in a case where the power receiver is at a short distance.

In addition, the antenna device 100A and the feed device 100 control the elevation angle of the beam 115 that is output from the array antenna 110, only in the XZ plane. With this arrangement, the number of phase shifters 120 is one-fourth of that obtained in a case where the elevation angle is controlled using both the XZ plane and the YZ plane. Thus, the antenna device 100A and the feed device 100 can be made at low costs.

In addition, by transmitting the power over an included angle range that allows for high power transmission efficiency, transmitted power of the beam 115 emitted by the antenna device 100A can be reduced to be predetermined power or smaller that is obtained by adding a limitation under a constraint on received power. In this arrangement, the effect of the transmission power signals on any other device that may exist around the power receiver 50B can be reduced. In addition, when the power is transmitted over an included angle range, such as the range of ±15 degrees, spread of a reflected portion in the tunnel is reduced, and thus the effect of a reflected wave on the other device that may exist around the power receiver 50B can be reduced.

In addition, the included angle range is an angle range that covers a front of the antenna device 100A and that extends a predetermined included angle. With this arrangement, power can be efficiently transmitted over the included angle range that covers the front of the antenna device 100A and that allows for high power transmission efficiency. In addition, when power is transmitted over the included angle range that covers the front of the antenna device 100A, the spread of a reflected wave, caused by reflection on the inner wall 51 or the like of the tunnel, can be suppressed. Thus, the effect of the transmission power signals on any other device that may exist around the power receiver 50B can be reduced.

When a first-side angle of +θ1 with respect to the frontal direction of the antenna device 100A, within the included angle range is equal to a second-side angle of −θ2 with respect to the frontal direction of the antenna device 100A, within the included angle range, in a case where the antenna device 100A moves in the X-axis direction with respect to the power receiver 50B, power can be efficiently transmitted over a range that is used when the power is transmitted by the antenna device 100A approaching the power receiver 50B; and a range that is used when the power is transmitted by the antenna device 100A moving away from the power receiver 50B, where the ranges are symmetrically distributed. When absolute values of the angle of +θ1 and the angle of −θ2 are identical, it is easy to control the angle of the beam 115.

The power receiver 50B includes multiple power receiving antennas 50B1 to 50B3 that are provided along the X-axis and receive respective transmission power signals. One marker 50A is provided for each of the multiple power receiving antennas 50B1 to 50B3. Further, the antenna device 100A moves along the X-axis so as to face the power receiving antennas 50B1 to 50B3, and in light of the power receiving antennas 50B1 to 50B3, the control unit 155 controls the phase shifters 120 a plurality of times, based on phase data. With this arrangement, the power can be efficiently transmitted to each of the power receiving antennas 50B1 to 50B3 over a given included angle range. One power receiver 50B can efficiently charge the battery over a short time period, with the power that is efficiently received by the power receiving antennas 50B1 to 50B3.

In addition, the multiple power receiving antennas 50B1 to 50B3 are arranged to be movable along the X-axis such that the beam 115 is continuously emitted over an included angle range a plurality of times. With this arrangement, the power can be continuously transmitted to the power receiving antennas 50B1 to 50B3 in the emission angle pattern, as illustrated in FIG. 9, and the power can be efficiently transmitted over a short time period. In addition, the power receiver 50B can efficiently receive the power over the short time period, over an included angle range that allows for high power reception efficiency. Because the power transmission is completed over the short time period, a possibility of interference caused by radio wave interference at any other device that may exist around the power receiver 50B can be reduced.

The power receiver 50B includes the multiple power receiving antennas 50B1 to 50B3 that are provided along the X-axis and receive respective transmission power signals. One marker 50A is provided for each of the multiple power receiving antennas 50B1 to 50B3. An interval between given power receiving antennas among the multiple power receiving antennas 50B1 to 50B3, travel speed of the antenna device 100A, and the included angle range are set such that the control unit 155 can control, based on phase data, the phase shifters 120 continuously a plurality of times, in light of the power receiving antennas 50B1 to 50B3. With this arrangement, with use of the emission angle pattern as illustrated in FIG. 9, the power can be continuously efficiently transmitted to the power receiving antennas 50B1 to 50B3 over a short time period. In addition, the power receiver 50B can efficiently receive the power in the short time period, over the included angle range that allows for high power reception efficiency.

The above embodiments are described using a manner in which the center of the fisheye lens 141 coincides with the center of the 4N antenna elements 111. However, the center of the fisheye lens 141 may be deviated from the center of the antenna elements 111. In this case, the coordinate origin used to compute the phase by array antenna control may be shifted by an amount of the deviation. Alternatively, the marker 50A and a given power receiving antenna may be provided so as to be separated from each other by an amount of a positional deviation between the marker 50A and the given power receiving antenna.

In addition, the embodiments are described using a manner in which the controller 150 includes the positional deviation detector 153. However, for example, when it is recognized that there is no positional deviation between the camera 140 and the marker 50A, the distance estimating unit 154 may not make corrections based on a positional deviation, without including the positional deviation detector 153 in the controller 150.

In addition, the embodiments are described using a manner in which the controller 150 includes the distance estimating unit 154. However, for example, in an application in which it is known that the facing distance $r_{FD}$ is constant, it is sufficient when multiple sets of phase data that correspond to one facing distance $r_{FD}$ are stored in the memory 156, without including the distance estimating unit 154 and the positional deviation detector 153 in the controller 150.

In addition, the embodiments are described using a manner in which the power receiver 50B includes the three power receiving antennas 50B1 to 50B3, and further the marker 50A is provided for each of the power receiving antennas 50B1 to 50B3. The number of power receiving antennas included in the power receiver 50B may be one or two, or may be four or more. It is sufficient when the number of power receiving antennas is determined as appropriate in accordance with the use of the power receiver 50B or restrictions or the like on the output of any other device that may exist around the power receiver 50B.

In addition, the embodiments are described using a manner in which the included angle range is a range of −15 degrees to ±15 degrees with respect to the frontal direction of the antenna device 100A. However, the included angle range is not limited to ±15 degrees. It is sufficient when the included angle range is appropriately set in accordance with the use of the power receiver 50B, or constraints or the like on the output of any other device that may exist around the power receiver 50B. The included angle range may be set as a range that allows for power transmission efficiency being equal to or higher than a predetermined value.

<Application Example and Feed System>

Figure 11:
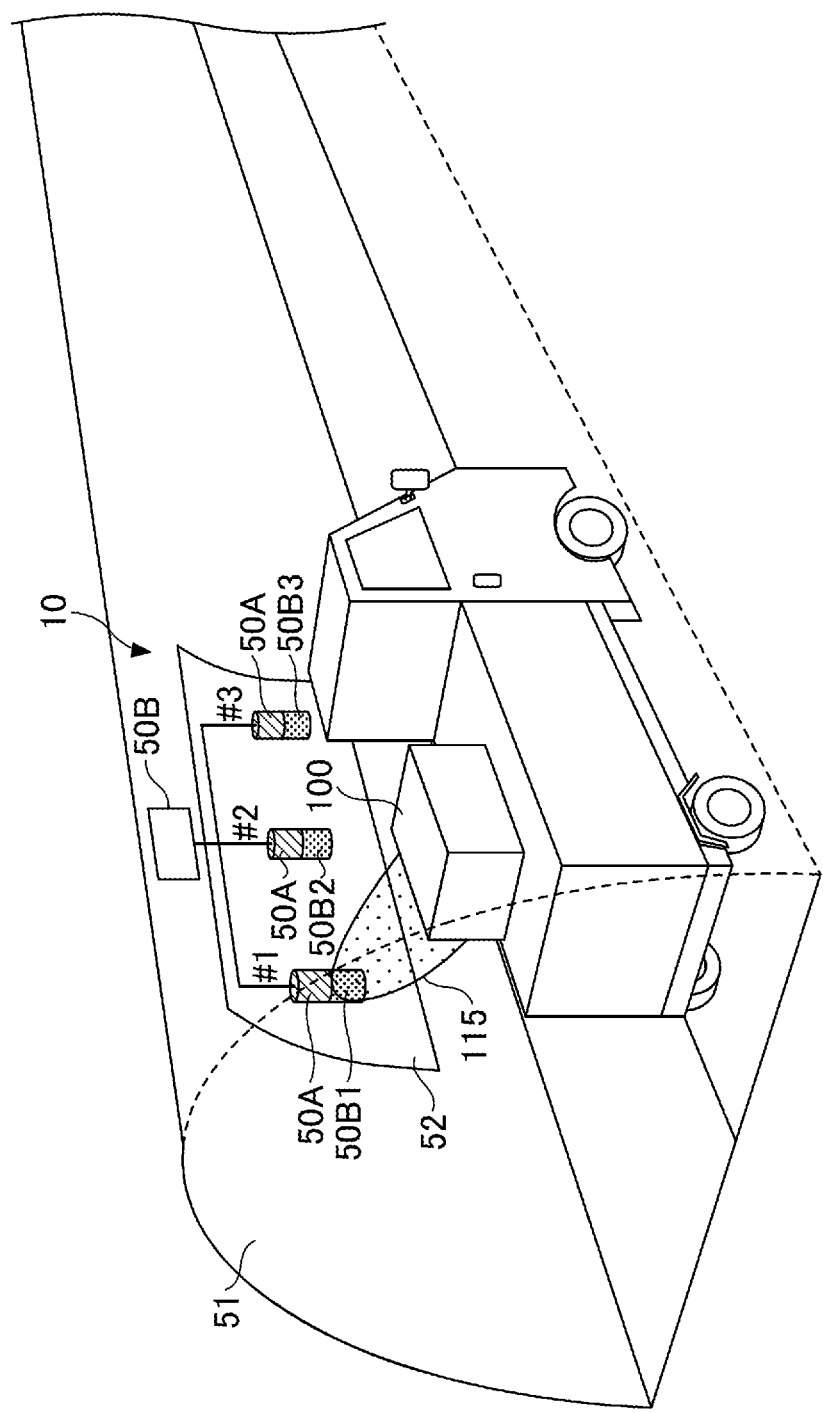
FIG. 11 is a diagram illustrating an application example of the feed device 100.

FIG. 11 is a diagram illustrating an application example of the feed device 100. The feed device 100 is mounted on a vehicle, for example. The power receiving antennas 50B1 to 50B3, which are used as targets, and a radio wave absorber 52 are provided on an inner wall 51 of a tunnel. One marker 50A is attached to each of the power receiving antennas 50B1 to 50B3, and one power receiver 50B is coupled to the power receiving antennas 50B1 to 50B3. The marker 50A includes a retroreflective plate, a mirror ball, or the like. A distance between the inner wall 51 of the tunnel and the vehicle varies from one tunnel to another through which the vehicle passes. However, in the same tunnel, the distance between the inner wall of the tunnel and the vehicle can be considered to be approximately constant. The radio wave absorber 52 is provided on the inner wall 51 of the tunnel so as to be located around the power receiving antennas 50B1 to 50B3. In an example, the radio wave absorber 52 is formed by a single sheet. The radio wave absorber 52 is located near the power receiving antennas 50B1 to 50B3, and is located around the power receiver 50B.

Here, a system that includes the feed device 100, markers 50A, the power receiver 50B, and the radio wave absorber 52 is the feed system 10 according to the embodiments. The power receiver 50B includes the three power receiving antennas 50B1, 50B2, and 50B3. The feed device 100 includes the antenna device 100A (see FIG. 1) and the microwave generator 130, and the feed system 10 includes the antenna device 100A, the microwave generator 130, the markers 50A, the power receiver 50B, and the radio wave absorber 52.

While the vehicle is traveling, the elevation angle $\theta a$ ($=r \cos \varphi/f_L$) can be determined by the camera 140 that converts the position of a given marker 50A into polar coordinates on a plane parallel to the XY plane, and by dividing an X-coordinate ($r \cdot \cos \varphi$) of a mapped position (mapped position that corresponds to P2a) that is obtained by mapping the polar coordinates onto the X-axis, by the focal distance $f_L$ of the fisheye lens 141. Then, by retrieving phase data that is obtained in accordance with changes in the elevation angle $\theta a$, from the memory 156, and by controlling shift amounts for the N phase shifters 120, transmission power signals from the N subarrays 110A to sequentially constantly reach the power receiving antennas 50B1 to 50B3 in the same phase in the included angle range can be transmitted, while the antenna device 100A and the feed device 100 are moving. The transmission power signals to be reached in the same phases are sequentially emitted, as beams, toward the power receiving antennas 50B1 to 50B3. At this time, a portion of the beam 115 from the antenna device 100A to be emitted toward the power receiving antennas 50B1 to 50B3, namely a given beam that is directly emitted to the inner wall 51 that covers the power receiving antennas 50B1 to 50B3; and a given reflected beam that is obtained after the given beam emitted toward the inner wall 51 that covers the power receiving antennas 50B1 to 50B3 can be absorbed by the radio wave absorber 52. With this arrangement, interference with any other device that may exist around the power receiver 50B can be suppressed.

For example, when the elevation angle θa of the marker 50A of #1 is zero degrees (0 degrees), a facing distance from the center of the fisheye lens 141 of the camera 140 to a corresponding marker 50A can be estimated. Further, when the transmission power signal is transmitted to the power receiving antenna 50B2 of the power receiver 50B that corresponds to the marker 50A of #2, an antenna gain can be further improved by retrieving, from the memory 156, phase data that is obtained based on the facing distance and the elevation angle, and by controlling shift amounts for the N phase shifters 120.

For example, the power receiving antennas 50B1 to 50B3, a sensor to monitor the loosening of one or more bolts at a fixed portion, a rectenna, and a wireless communication module are provided at the fixed portion at which an infrastructural object such as a jet fan or a sign that is attached to the inner wall 51 of the tunnel is fixed. Further, when the beam 115 is emitted by the feed device 100 toward the power receiving antennas 50B1 to 50B3, while traveling in the vehicle, the rectenna that is coupled to the power receiving antennas 50B1 to 50B3 generates power to activate the wireless communication module. Then, the wireless communication module emits a signal indicating an output of the sensor, and a vehicle side receives the signal. With this arrangement, a fixed state of the infrastructural object can be inspected while the vehicle is traveling.

In this case, the wireless communication module may receive a signal indicating the output of the sensor, through the array antenna 110.

The beam 115 is controlled by determining an X-coordinate (r·cos φ) of a mapped position (mapped position that corresponds to P2a) that is obtained by performing mapping on the X-axis at the position of a corresponding power receiving antenna among the power receiving antennas 50B1 to 50B3, which is deviated from the XZ plane, and by using, as the elevation angle θa, a value (r·cos φ/$f_L$) that is obtained by dividing the X-coordinate (r·cos φ) by the focal distance $f_L$ of the fisheye lens 141. With this arrangement, even in a case where the vehicle travels in any one of the positive or negative Y-axis after the X-axis travel, the elevation angle θa can be determined by avoiding the effect of the positional deviation.

Although the manner in which the feed device 100 (antenna device 100A) communicates with the wireless communication module provided on the inner wall 51 of the tunnel is described with reference to FIG. 11, the wireless communication module is not limited to a module provided on the inner wall 51 of the tunnel. The wireless communication module may be provided in various places or the like. In this arrangement, the feed device 100 (antenna device 100A) can be used as a communication device.

<Angular Characteristics of Radio Wave Absorber 52>

FIG. 12 is a diagram illustrating a characteristic example of a reflection coefficient with respect to an incident angle of the beam 115 to the radio wave absorber 52. In FIG. 12, the horizontal axis expresses the incident angle of the beam 115 with respect to the radio wave absorber 52. The incident angle is an incident angle of the beam 115 with respect to a normal line to the surface of the radio wave absorber 52.

As illustrated in FIG. 12, the lowest reflection coefficient is obtained with respect to the incident angle of 0°, and is about −20 dB. The reflection coefficient increases in accordance with the incident angle that is increased from 0° to 90°. A low reflection coefficient shows a large amount of radio waves that are absorbed by the radio wave absorber 52, and a high reflection coefficient shows a small amount of radio waves that are absorbed by the radio wave absorber 52. When the incident angle is approximately in the range of 0° to 15°, or the range of 0° to 20°, a sufficiently low reflection coefficient is obtained.

For example, when the included angle range is set to be the range of +15 degrees, in a case where the beam 115 is emitted by the antenna device 100A, the incident angle with respect to the radio wave absorber 52 falls within the range of ±15 degrees. In this arrangement, even when a state occurs in which a portion of the beam 115 that is emitted by the antenna device 100A is not received by each of the power receiving antennas 50B1 to 50B3, the radio wave absorber 52 absorbs the portion of the radio wave. Thus, interference caused by reflected waves with respect to any other device that may exist around the power receiver 50B can be suppressed.

In addition, the spread of a reflected portion due to the transmitting of the power over an included angle range, such as a range of ±15 degrees, is reduced. In this arrangement, the radio wave absorber 52 having high absorption efficiency that is obtained using the included angle range is appropriate. Thus, even when reflection occurs in a case where power is transmitted over the included angle range, such as a range of ±15 degrees, a reflected portion can be efficiently absorbed by the radio wave absorber 52. As a result, the effect of the reflected wave on any other device that may exist around the power receiver 50B can be reduced.

Although the antenna device, the feed system, the feed device, and the feed method according to the exemplary embodiments of the present invention are described above, the present invention is not limited to the specifically disclosed embodiments. Various modifications and changes can be made without departing from the scope of the claims.

This international application claims priority to Japanese Patent Application No. 2021-100369 filed Jun. 16, 2021, the entire contents of which are incorporated herein by reference.

DESCRIPTION OF SYMBOLS 10 feed system
50B power receiver
50B1 to 50B3 power receiving antenna
52 radio wave absorber
100 feed device
110 array antenna
110A subarray
111 antenna element
120 phase shifter
130 microwave generator
140 camera
141 fisheye lens
150 controller
151 position deriving unit
152 elevation-angle acquiring unit 153 positional deviation detector
154 distance estimating unit
155 control unit
156 memory

The invention claimed is:

1. An antenna device comprising:
an array antenna including multiple antenna elements that are bidimensionally arranged along a first axis and a second axis;
a phase adjuster configured to adjust phases of transmission power signals that are respectively supplied by the multiple antenna elements, with respect to a first axis direction;
an image acquiring device configured to acquire an image through a fisheye lens;
circuitry configured to
convert a first position of a marker that is included in the image acquired by the image acquiring device, into a second position of polar coordinates on a first plane that includes the first axis and the second axis, the first position being used in the image acquiring device, and
acquire, based on the second position, an elevation angle of a projected position that is obtained by projecting the first position onto a second plane including the first axis and a third axis, the elevation angle being relative to the third axis of the second plane; and
a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched,
wherein the circuitry is configured to
retrieve, from the storage, the phase data in association with the acquired elevation angle, and
control the phase adjuster such that a direction of a beam, emitted by the array antenna based on the retrieved phase data, defines the elevation angle for the second plane, and
wherein the phase data is phase data relating to the elevation angles that are within a predetermined included angle range.

2. The antenna device according to claim 1, wherein the storage stores the multiple sets of phase data for the elevation angles, and stores power data indicating transmitted power of the transmission power signals,
wherein the circuitry is configured to
control the phase adjuster based on the phase data, and
control the transmitted power of the transmission power signals in accordance with retrieved power data, and
wherein the power data indicates the transmitted power of predetermined power or smaller that is obtained by adding a limitation under a constraint on received power of a device other than the power receiver, the transmitted power being configured to be obtained at a space at which the marker, disposed on a wall, is present.

3. The antenna device according to claim 1, wherein the predetermined included angle range is an angle range that covers a direction defining the elevation angle of 0 degrees relative to the third axis, the angle range having an extension of a predetermined included angle.

4. The antenna device according to claim 3, wherein in the predetermined included angle range, a first angle range of a first side with respect to the direction that defines the elevation angle of 0 degrees relative to the third axis is equal to a second angle range of a second side with respect to the direction that defines the elevation angle of 0 degrees with respect to the third axis, in the predetermined included angle range.

5. The antenna device according to claim 1, wherein the power receiver includes multiple power receiving antennas provided along the first axis and configured to receive the power of the transmission power signals,
wherein the marker is provided for each of the multiple power receiving antennas,
wherein the antenna device is configured to move relative to the multiple power receiving antennas, along the first axis, and
wherein the circuitry is configured to control, based on the phase data, the phase adjuster a plurality of times, taking into account the multiple power receiving antennas.

6. The antenna device according to claim 5, wherein the multiple power receiving antennas are arranged to be movable along the first axis such that the beam is continuously emitted over the predetermined included angle range a plurality of times.

7. The antenna device according to claim 5, wherein the power receiver includes multiple power receiving antennas provided along the first axis and configured to receive the power of the transmission power signals,
wherein the marker is provided for each of the multiple power receiving antennas, and
wherein an interval between given power receiving antennas of the multiple power receiving antennas, a travel speed of the antenna device, and the predetermined included angle range are set such that the circuitry is configured to continuously control the phase adjuster a plurality of times based on the phase data, taking into account the multiple power receiving antennas.

8. The antenna device according to claim 1, wherein the circuitry is configured to estimate a distance from the image acquiring device to the marker, based on the acquired image, in a case where the acquired elevation angle is 0 degrees,
wherein the storage stores the multiple sets of phase data for respective multiple distances each of which is from the image acquiring device to the marker, and
wherein the circuitry is configured to
retrieve, from the storage, the phase data based on the estimated distance and the acquired elevation angle, and
control the phase adjuster based on the retrieved phase data.

9. The antenna device according to claim 8, wherein the circuitry is configured to
detect a positional deviation between the image acquiring device and the marker in a second axis direction, based on a position of a center of gravity of the marker included in the acquired image, and
estimate the distance from the image acquiring device to the marker, based on the image that is obtained by making a correction in accordance with a degree of the detected positional deviation.

10. The antenna device according to claim 1, wherein the circuitry is configured to determine, as the elevation angle, a value that is obtained by dividing coordinates of a mapped position, which is obtained by mapping the second position onto the first axis, by a focal length of the fisheye lens.

11. The antenna device according to claim 10, wherein the coordinates of the mapped position are indicated by a value that is obtained by multiplying a radius vector used for the polar coordinates by a cosine of an argument.

12. The antenna device according to claim 1, wherein the multiple antenna elements are grouped into multiple subarrays each of which extends along a second axis direction, and
wherein the phase adjuster includes multiple phase shifters coupled to the respective subarrays and configured to adjust phases of given transmission power signals, for each of the subarrays.

13. The antenna device according to claim 1, wherein the transmission power signals supplied by the multiple antenna elements are configured to be weighted to provide low sidelobes of the beam emitted by the array antenna.

14. The antenna device according to claim 1, wherein the circuitry is configured to
set a region of the image in which the marker is to be detected, to be within the predetermined included angle range, and
track the marker in the region by region of interest (ROI) control.

15. A feed system comprising:
the antenna device according to claim 1;
a radio wave generator configured to supply the transmission power signals to the multiple antenna elements;
the power receiver;
the marker attached to the power receiver; and
a radio wave absorber disposed around the power receiver.

16. A feed device comprising:
an array antenna including multiple antenna elements that are bidimensionally arranged along a first axis and a second axis;
a radio wave generator;
a phase adjuster provided between the array antenna and the radio wave generator, and configured to adjust phases of transmission power signals that are respectively supplied from the radio wave generator to the multiple antenna elements, with respect to a first axis direction;
an image acquiring device configured to acquire an image through a fisheye lens;
circuitry configured to
convert a first position of a marker that is included in the image acquired by the image acquiring device, into a second position of polar coordinates on a first plane that includes the first axis and the second axis, the first position being used in the image acquiring device; and
acquire, based on the second position, an elevation angle of a projected position that is obtained by projecting the first position onto a second plane including the first axis and a third axis, the elevation angle being relative to the third axis of the second plane; and
a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched,
wherein the circuitry is configured to
retrieve, from the storage, the phase data in association with the acquired elevation angle, and
control the phase adjuster such that a direction of a beam, emitted by the array antenna based on the retrieved phase data, defines the elevation angle for the second plane, and
wherein the phase data is phase data relating to the elevation angles that are within a predetermined included angle range.

17. A feed method by a feed device that includes:
an array antenna including multiple antenna elements that are bidimensionally arranged along a first axis and a second axis;
a radio wave generator;
a phase adjuster provided between the array antenna and the radio wave generator, and configured to adjust phases of transmission power signals that are respectively supplied from the radio wave generator to the multiple antenna elements, with respect to a first axis direction;
an image acquiring device configured to acquire an image through a fisheye lens;
circuitry configured to
convert a first position of a marker that is included in the acquired image, into a second position of polar coordinates on a first plane that includes the first axis and the second axis, the first position being used in the image acquiring device;
acquire, based on the second position, an elevation angle of a projected position that is obtained by projecting the first position onto a second plane including the first axis and a third axis, the elevation angle being relative to the third axis of the second plane; and
a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched,
wherein the circuitry is configured to
retrieve, from the storage, the phase data in association with the acquired elevation angle, and
control the phase adjuster such that a direction of a beam, emitted by the array antenna based on the retrieved phase data, defines the elevation angle for the second plane, wherein the phase data is phase data relating to the elevation angles that are within a predetermined included angle range, the feed method comprising:
retrieving, from the storage, the phase data in association with the acquired elevation angle; and
controlling the phase adjuster such that the direction of the beam, emitted by the array antenna based on the retrieved phase data, defines the elevation angle for the second plane.

* * * * *